(12) United States Patent
Lord

(10) Patent No.: US 8,510,204 B2
(45) Date of Patent: Aug. 13, 2013

(54) SYSTEM, METHOD, AND APPARATUS FOR TRADING IN A DECENTRALIZED MARKET

(75) Inventor: Thomas Lord, Green Mountain Falls, CO (US)

(73) Assignee: PrivateMarkets, Inc., Torrington, CT (US)

( * ) Notice: Subject to any disclaimer, the term of this patent is extended or adjusted under 35 U.S.C. 154(b) by 1109 days.

(21) Appl. No.: 11/670,054

(22) Filed: Feb. 1, 2007

(65) Prior Publication Data

US 2007/0179881 A1 Aug. 2, 2007

Related U.S. Application Data

(60) Provisional application No. 60/765,276, filed on Feb. 2, 2006.

(51) Int. Cl.
*G06Q 40/00* (2012.01)

(52) U.S. Cl.
USPC .......................................................... 705/37

(58) Field of Classification Search
USPC .................................................... 705/35–45
See application file for complete search history.

(56) References Cited

U.S. PATENT DOCUMENTS

| | | | |
|---|---|---|---|
| 4,677,552 A | 6/1987 | Sibley, Jr. | |
| 6,285,989 B1 | 9/2001 | Shoham | |
| 6,356,905 B1* | 3/2002 | Gershman et al. | 707/10 |
| 6,408,282 B1 | 6/2002 | Buist | |
| 6,424,953 B1 | 7/2002 | Glassman et al. | |
| 6,560,580 B1 | 5/2003 | Fraser et al. | |
| 6,892,195 B2 | 5/2005 | Lee et al. | |
| 7,155,681 B2* | 12/2006 | Mansour et al. | 715/762 |
| 7,383,222 B2* | 6/2008 | Keith | 705/37 |
| 7,461,148 B1* | 12/2008 | Beloussov et al. | 709/226 |
| 2001/0003179 A1 | 6/2001 | Martyn et al. | |
| 2001/0032170 A1 | 10/2001 | Sheth | |
| 2001/0034688 A1 | 10/2001 | Annunziata | |
| 2002/0007335 A1 | 1/2002 | Millard et al. | |
| 2002/0007338 A1 | 1/2002 | Do | |
| 2002/0010672 A1 | 1/2002 | Waelbroeck et al. | |
| 2002/0046157 A1 | 4/2002 | Solomon | |
| 2002/0069279 A1 | 6/2002 | Romero et al. | |
| 2002/0091624 A1 | 7/2002 | Glodjo et al. | |
| 2002/0111896 A1 | 8/2002 | Ben-Levy et al. | |

(Continued)

FOREIGN PATENT DOCUMENTS

| | | |
|---|---|---|
| EP | 1228460 | 11/2000 |
| WO | WO 0016232 A1 | 3/2000 |

(Continued)

OTHER PUBLICATIONS

International Searching Authority, International Search Report, PCT/US 07/61531, May 29, 2008; 3 pages.

(Continued)

*Primary Examiner* — Thomas M Hammond, III
(74) *Attorney, Agent, or Firm* — Sheridan Ross P.C.

(57) ABSTRACT

A method and system for facilitating the execution of transactions in a decentralized market are provided herein. The decentralized market includes a number of execution points each associated with and maintained in a secure environment by a single participant. Each participant is able to control the amount of data that is made publicly available, if at all, regarding any transactions that are conducted at that participant's execution point.

20 Claims, 18 Drawing Sheets

(56) References Cited

U.S. PATENT DOCUMENTS

| | | |
|---|---|---|
| 2002/0120570 A1 | 8/2002 | Loy |
| 2002/0133446 A1 | 9/2002 | Lee |
| 2002/0152153 A1 | 10/2002 | Nakagawa |
| 2002/0156719 A1 | 10/2002 | Finebaum et al. |
| 2002/0165815 A1 | 11/2002 | Vincent |
| 2002/0165844 A1 | 11/2002 | Lee et al. |
| 2003/0018561 A1 | 1/2003 | Kitchen et al. |
| 2003/0033239 A1 | 2/2003 | Gilbert et al. |
| 2003/0046534 A1 | 3/2003 | Alldredge |
| 2003/0115123 A1 | 6/2003 | Lang |
| 2003/0204466 A1 | 10/2003 | Guo et al. |
| 2003/0216932 A1 | 11/2003 | Foley |
| 2003/0225662 A1 | 12/2003 | Horan et al. |
| 2004/0034591 A1 | 2/2004 | Waelbroeck et al. |
| 2004/0059660 A1 | 3/2004 | Michael |
| 2004/0059666 A1 | 3/2004 | Waelbroeck et al. |
| 2004/0068462 A1 | 4/2004 | Katz et al. |
| 2004/0073502 A1 | 4/2004 | Agrawal et al. |
| 2004/0093516 A1 | 5/2004 | Hornbeek et al. |
| 2004/0199442 A1* | 10/2004 | Haberle ............... 705/35 |
| 2005/0075963 A1 | 4/2005 | Balabon |
| 2005/0080705 A1 | 4/2005 | Chaganti |
| 2005/0084100 A1* | 4/2005 | Spies et al. .............. 380/30 |
| 2005/0131801 A1* | 6/2005 | Glodjo .................. 705/37 |
| 2005/0228741 A1 | 10/2005 | Leibowitz |
| 2005/0283422 A1 | 12/2005 | Myr |
| 2005/0289017 A1 | 12/2005 | Gershom |
| 2006/0026090 A1 | 2/2006 | Balabon |
| 2006/0041436 A1 | 2/2006 | Brodie et al. |
| 2008/0033863 A1* | 2/2008 | Simons et al. ............ 705/37 |

FOREIGN PATENT DOCUMENTS

| | | |
|---|---|---|
| WO | WO03048905 | 6/2003 |
| WO | WO2005003894 | 1/2005 |
| WO | WO 2006/002660 | 1/2006 |

OTHER PUBLICATIONS

International Searching Authority, Written Opinion, PCT/US 07/61531, May 29, 2008; 7 pages.

International Preliminary Report on Patentability for International (PCT) Patent Application No. PCT/US2007/061531, issued Aug. 5, 2008.

Extended European Search Report for European Patent Application No. 07717538.8, dated Apr. 26, 2011 6 pages.

* cited by examiner

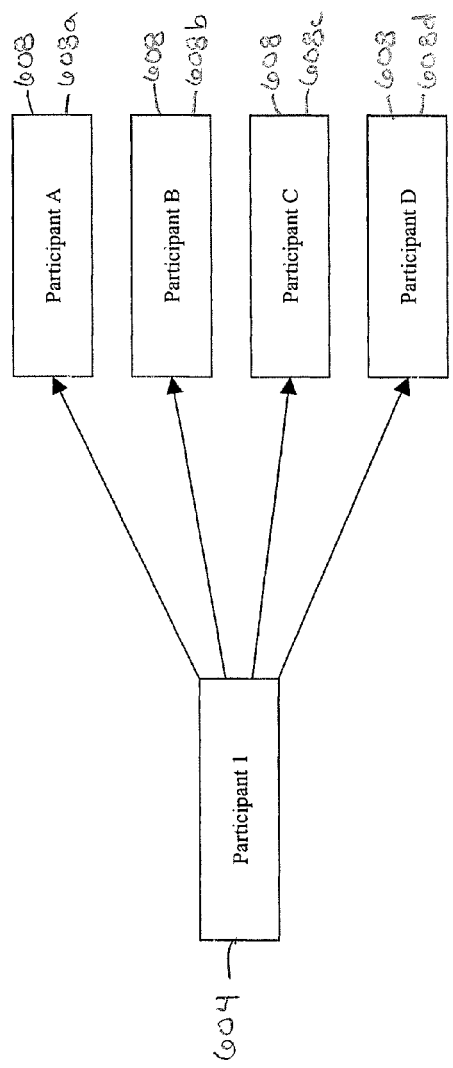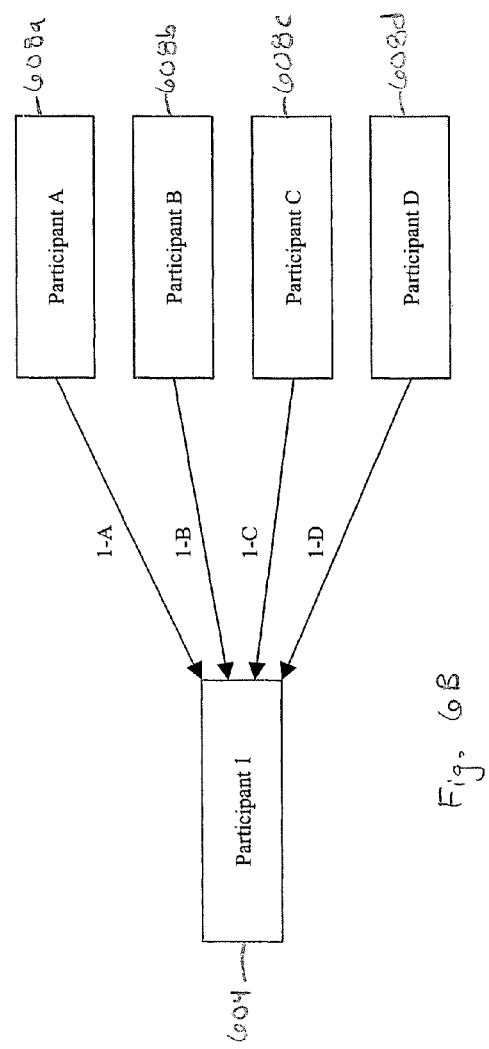

SYSTEM, METHOD, AND APPARATUS FOR TRADING IN A DECENTRALIZED MARKET

CROSS REFERENCE TO RELATED APPLICATIONS

This Application claims the benefit of U.S. Provisional Application No. 60/765,276, filed Feb. 2, 2006, the entire disclosure of which is hereby incorporated herein by reference.

FIELD

A system, method, and apparatus are provided for maintaining a decentralized trading market where, for example, commodities trading can occur. In particular, transactions are created and executed in the decentralized market and information relating to these transactions is selectively shared with other participants compliant with preferences of an originating participant.

BACKGROUND

Existing automated transaction execution markets are based on a single execution point or matching engine (i.e., a computer, server, or the like). The single execution point enables the market operator to control and monitor all market functions. In many cases, there is a second "backup" execution point to assume market operation upon indication of any instability or inoperability of the primary execution point.

Referring to FIG. 1, a traditional centralized market 100 is depicted. The centralized market 100, for example the New York Stock Exchange, has a number of participants 104 that are each collected to a single execution point (i.e., a central trading server). One drawback to a centralized market 100 is that in order for a participant 104 to execute a transaction in the market, the participant 104 must send transaction information to the execution point 108. At the central execution point 108 the transaction is executed, e.g., a sale of stock or bonds occurs, and information related to the transaction is made available to all other participants 104 in the market. In other words, all transactions in the centralized market 100 are transparent to all participants 104, regardless of whether the participant 104 was involved in the trade.

The transaction information may include the amount of stock purchased and the price of each share of stock purchased. The purchasing participant 104 and the company who's stock was just purchased have no control over the information that is displayed publicly.

The centralized market structure creates market liquidity, and therefore executable trades, by placing all bids and offers in open and transparent competition with each other. In this manner, the centralized market depends on competing offers to create pressure to reduce the offered price to secure a transaction and similarly to induce the bid side of the market to raise bids. By this competitive pressure, the centralized market secures liquidity and creates executable trades.

The current centralized market, because of the described mechanism for creating executable transactions, requires that transactions be decomposed into individual quanta of risk, such as single time period standard contract terms or specified equal amount combinations of specific time period standard contract terms. This rigidity in the market execution mechanism creates rigidity in the available transactions that the market can execute and, inherently, reduces the efficiency of risk transfer between buyers and sellers.

Another problem with current centralized markets 100 is that the seller cannot customize an offer. Rather, every participant has an opportunity to purchase the good. The central execution point structure has an advantage of creating a single interconnecting application and a central depository for system information. However, the central execution point introduces a single point of market failure, increases system fragility, and allows for data corruption at a single point.

SUMMARY

One aspect of the present invention is to utilize new advances in computing teleology to develop a decentralized execution structure in a single, continuously operating transaction network. In the past it was possible to create specific execution points at various locations, but only by constructing an execution structure for the specified transaction.

As used herein the terms "trade", "transaction", and "offer" are used synonymously to describe a negotiated or agreed upon exchange of goods, services, and/or currency between two or more participants. However, a transaction may include one or more offers to different counterparties.

In accordance with at least one embodiment of the present invention, the utilization of systems to construct a market structure that creates and manages an execution point for each individual transaction based on the business rules for market operations is provided. In this manner, the process of creating and managing a potential transaction uniquely identifies the location in the network that would, for that specific transaction, "own" the execution point and the business rules for execution.

In one embodiment of the present invention, a decentralized market structure is provided by allowing an originator of a transaction to maintain that transaction at a local server, rather than a centralized server as in the prior art. The originator has its own execution point for its transactions. Because of this fact, the originator of a transaction can selectively invite other participants. Additionally, the originator does not have to share the transactional information with any other party that is not involved in the transaction. When an originator generates a message comprising information related to that transaction, only the invited participants receive the information related to the transaction. For example, if a first participant is the originator of a particular transaction and wishes to invite only second and third participants, then the second and third participants will be the only parties in the entire network that are able to receive information related to the transaction that first participant has just originated.

The system and methodology as presented herein, is vastly different from the current systems employed in a centralized market. Specifically, in a centralized market (e.g., New York Mercantile Exchange (NYMEX), Inter Continental Exchange (ICE), etch), whenever any party wishes to initiate a transaction using a centralized market, the information related to that transaction could be viewed by any party that is connected to the centralized execution point. Transactional knowledge and/or information becomes public the minute it is sent to the execution point for other participants to engage in. Furthermore, under some market configurations, the originator does not have any control over which participants can engage in the transaction under a centralized market scheme.

ICE technology allows the originator to control who can execute a transaction. However, all market participants are still allowed to see the transaction information once submitted to the market. Under this configuration, the originator may have control over which participants can engage in transactions with the originator but cannot control the ability of other market participants, with whom the originator has no intention of transacting, from inserting themselves into the market and transacting in a manner that diminishes the ability of the originator to secure a transaction. Central markets, by their nature, are designed to stack all bids and offers for a product in one queue, thus making all transactions transparent to all other participants. Conversely, the decentralized market structure provides market transparency for a restricted, and sometimes selected, subset of potential participants, thereby creating a virtual private market.

In accordance with embodiments of the present invention, the decentralized market and its messaging removes the transparency commonly associated with centralized markets much in the way multiple telephone conversations do not allow individuals not included in any specific conversation to overhear the content of other conversations. Rather, the decentralized virtual private market relies on the relationship between the parties and their observation of information external to the market to create pressure to secure a transaction. This fundamental difference of the market execution force is one factor in the commercial application of embodiments of the invention.

In accordance with further embodiments of the present invention, the decentralized virtual private market allows flexibility for a party to create the most efficient transfer of risk it can design. Unlike the centralized market that focuses on creating standard products to allow anonymous market forces to drive execution of standard transactions; the decentralized market acts to allow a restricted group of parties to negotiate the best value of a specified transaction.

In accordance with at least some embodiments of the present invention, an originator in the decentralized virtual private market is able to control, which participants can engage in the transaction because only those participants who received an invitation will be able to engage in the transaction. This creates a system and methodology where privacy and confidentiality can be tightly controlled.

It should be noted that communication between network participants in this market structure may be dependent upon the creation of an execution point. Communication between participants may not be effectuated unless an execution point has been created at one or both participants. In this manner, the decentralized market does not resemble a bulletin board or messaging forum transaction structure. Similarly, the decentralized market does not replicate existing commodity exchanges where the central execution point enables the market operator to participate in the transaction and information flow. Embodiments of the present invention provide a market that allows market participants to design, communicate and automatically execute transactions among other network participants and not with the network operator.

In accordance with embodiments of the present invention, market structure does riot create permanent execution points at each network location. Conversely, execution points may be transaction specific, created by the participant for the transaction duration. In one embodiment, once a transaction is consummated or terminated, the execution point is extinguished. The ability to create a single execution point or multiple execution points at any network node is always present but the existence of an execution point may be transaction specific.

In accordance with various embodiments of the present invention, the structure may also include a design that allows transaction data to be stored at the execution point for each specific transaction. A system administrator or network operator may have the right and capability to access the stored data as provided in the network license, but all other market participants only have access to the transaction data for messages between the execution point and their specific network site. In this manner, market data is dispersed. Only by corrupting every execution point on the network can outside parties access all transaction information. The system can also be designed to allow access to all transaction data regardless of transaction status or may be encrypted to allow access to data only under specific transaction criteria. For instance, transaction audits for a specific transaction may be available only upon execution of the transaction on the network.

In accordance with at least some embodiments of the present invention, the decentralized market structure provides market participants the option of creating and successfully executing a held "trade" or held order. A held order is essentially a time dependent free option on a transaction. When an originating party issues the option of a held trade to a counterparty, the originating party is offering the counter party an irrevocable offer that the counter party can execute within a predetermined amount of time. In other words, the transactional information may have state that the currently presented transaction is offered to a single counterparty for a limited time. During that time, regardless of what happens in the rest of the market, the counterparty has the option to execute the transaction based on its original terms. The originating party is meanwhile typically waiting for the single counterparty to accept or have the held trade expire. If the counterparty accepts the terms of the held trade, then the trade is executed. However, if time expires, then the originating party will be free to offer a different transaction to the same counterparty or offer another transaction to a different counterparty. Typical centralized market execution points are designed to execute the first bid/offer on a given transaction. Whereas, according to at least some embodiments of the present invention, a held trade can be used to make an offer to a certain counterparty for a predetermined amount of time and restrictions can be applied to the party offering the held trade such that rules of the held trade are followed by both parties.

In accordance with one embodiment of the present invention a method of initiating a transaction in a decentralized commodities market is provided. The method includes providing a database of transactional information. Then it depends on the originating party determining at least one participant that will be invited to participate in the transaction. In response to determining the identity of the at least one participant, the network generates participant data. Then the originator determines transaction details, and the system generates transaction data. Thereafter, a message is created that comprises the participant data and the transaction data. Then the system transmits the message to the determined participant(s), where the message is transmitted from the originating execution point, and where information related to the transaction is maintained in a secure state at the originating execution point.

Thus, in one embodiment of the present invention a method of initiating a transaction in a decentralized market is provided, the method, comprising:

providing a database of transactional information;

determining at least one participant that will be invited to participate in said transaction;

in response to determining said at least one participant, generating participant data;

determining transaction details;

in response to determining said transaction details, generating transaction data;

creating a message comprising at least one of said participant data and transaction data; and sending said message to said at least one participant (as designated by the party creating the transaction), wherein said message is transmitted from a single originating execution point to a execution points of said at least one participant and wherein information related to said transaction is maintained in a secure state at said originating execution point and at all receiving points.

These and other features and advantages of this invention are described in, or are apparent from, the following detailed description of the exemplary embodiments. The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 6A is a block diagram depicting an originator sending offers to a number of counterparties in a decentralized market in accordance with embodiments of the present invention;

FIG. 6B is a block diagram depicting the specific instance of originator receipt of counteroffers from all selected counterparties in a decentralized market in accordance with embodiments of the present invention;

DETAILED DESCRIPTION

Figure 1:
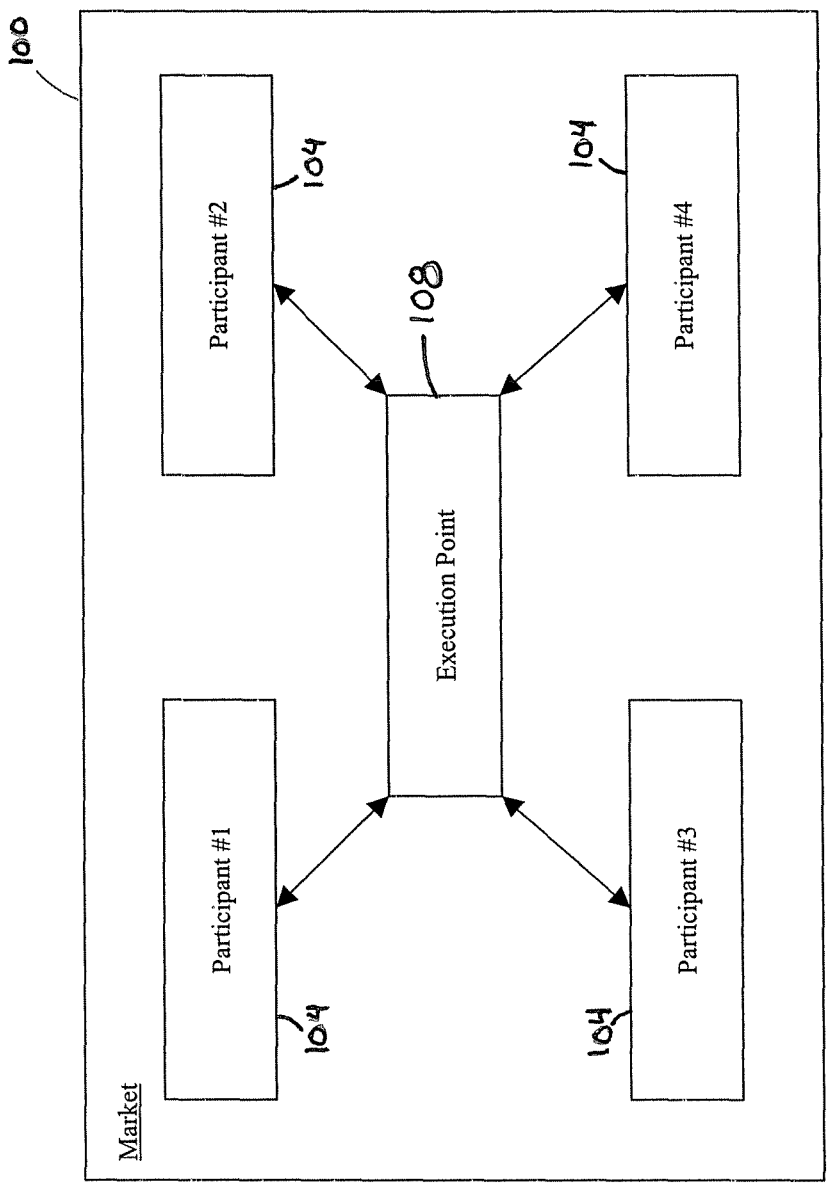
FIG. 1 is a block diagram depicting a centralized market structure in accordance with embodiments of the prior art.
Figure 2:
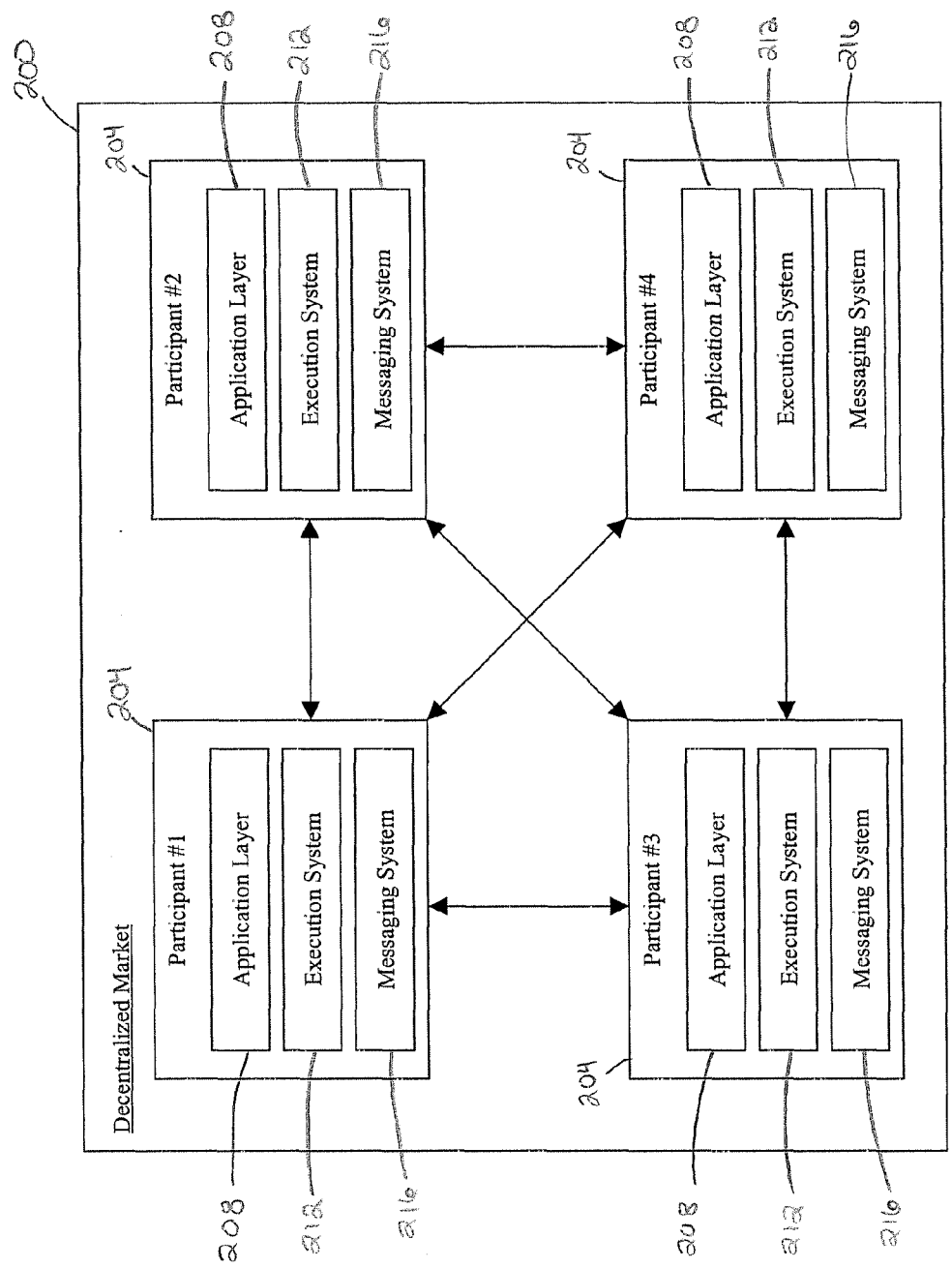
FIG. 2 is a block diagram depicting a decentralized market structure in accordance with embodiments of the present invention.

Referring to FIG. 2, an example of a decentralized market 200 is depicted. In the depicted embodiment, the decentralized market 200 comprises four participants 204. As can be appreciated by one of skill in the art, the decentralized market 200 may contain at a minimum two participants 204 up to hundreds or thousands of participants. Four participants 204 are depicted for exemplary purposes only.

Each participant 204 may have their own application layers 208, execution systems 212, and messaging systems 216. The messaging system 216 allows each participant 204 to communicate with other participants 204 in the decentralized market 200. Furthermore, the messaging system 216 may restrict communications between participants 204 commensurate with requirements of the decentralized market 200. The messaging system 216 generally represents a means by which each participant 204 can transmit and receive messages. The messaging system 216 may further be characterized by the ability to encrypt messages for secure transmission across a publicly accessible communication network, such as the Internet, for example.

One participant 204 in the decentralized market 200 may be collected, either through wired connections, wireless connections, or by some other sort of communications network or means, with every other participant 204. This is different from the prior art in that a common node need not be used to connect every participant 204 in the structure. By having each participant 204 connected to every other participant in the decentralized market 200, a reliance on one central execution point is overcome. In the event that one participant 204 has their execution system 212 rendered unusable, only transactions concerning that participant 204 will be effected. All other participants 204 may continue to conduct their transactions with all other participants 204 still connected to the decentralized market 200.

Each participant 204 is depicted as having a local execution system 212 that can be used to execute transactions in the decentralized market 200. In accordance with one embodiment of the present invention, the execution system 212 of the originating participant 204 is used to automatically execute a given trade based on input trade parameters received from an acceptance message having a standard data format for trades. It follows that only a single execution point is necessary to support a single transaction. However, to support a decentralized market 200 where a larger amount of trading occurs between different parties, each participant 204 may be provided with an execution system 212 such that when ever a participant 204 decides to originate a transaction, that participant 204 has the ability to execute the transaction in the decentralized market 200. The execution systems 212 may generally constitute execution means that afford the participant 204 the capability of automatically executing transactions locally and controlling the dissemination of information related to that transaction. Although the execution system 212 is generally designed to automatically execute trades having a standard data format (i.e., trades from a standard data template), it should be noted that deals designed by participants 204 may vary greatly (e.g. in cost, quantity, location, product, and other parameters) from transaction to transaction. The standard data format simply provides the execution system 212 the ability to receive a message and understand the terms of the transaction automatically without interpreting the language within the message. This allows the execution system 212 to quickly and accurately execute transactions in the decentralized market 200 without the direct assistance of a user.

The application layer 208 provides a user of the execution system 212 an interface to the decentralized market 200. Furthermore, the application layer 208 may provide rules for engaging in transactions and well as instructions for executing various transactions and performing other features in accordance with embodiments of the present invention. More specifically, the application layer 208 may include instructions related to, without limitation, controls for user permissions, preferences, trade and message sorting, trade and message filters, rules for trading, rules for executing a one-cancels-other trade, risk management, audit logs, message synchronization between participants 204, and so on. The application layer 208 generally constitutes a means for performing various functions as discussed herein as well as a means for allowing a user to participate in the decentralized market 200.

Collectively, instructions associated with the application layer 208, execution system 212, and messaging system 216 may be stored in local memory. A processor may also be provided to execute the instructions stored in memory. Devices used by participants 204 to interact with the decentralized market 200 may include, but are not limited to, a server, a personal computer, a laptop, a Blackberry®, a Personal Digital Assistant, or other types of processing/communication devices. When a participant wishes to initiate a transaction, he/she inputs the desired transaction information into the execution device via a user input. The processor, possibly utilizing instructions associated with the application layer 208, generates a message based on the transaction information. The format of the message may be determined by instructions associated with the messaging system 216. The message may include information relating to the item(s) that the transaction is directed toward, invited participants 204, uninvited participants 204, required time to respond to transaction, amount of money required to participate in transaction, number of participants 204 in the transaction, and any other information that may define the personalized transaction.

In accordance with embodiments of the present invention, a first participant 204 "owns" for the period of the transaction a private transaction execution point 212. The first participant 204 may be enabled to conduct (e.g., prepare, offer, and/or execute) transactions with any of the other participants 204 in the decentralized market 200. The second participant 204 may also have a personal transaction execution point 212 that enables the second participant 204 to conduct transactions with the other participants 204. The execution points 212 of the first and second participants 204 may become activated and able to execute a trade when those particular participants originates a trade offer.

The third and fourth participants 204 are depicted as having private execution points 212 as well; however, if these participants 204 do not originate a transaction or receive a held order their execution points 212 are inactive and thus the third and fourth participants 204 may only participate in a transaction when either the first or second participant 204 initiates a transaction with them. Additionally, more participants may be present outside of the depicted decentralized market 200. These additional participants may be provided with execution points but have not been invited to a transaction by the first or second participants 204 and therefore are not able to participate unless they receive an invitation to participate. Additionally, since the other participants were not invited, the participants are not considered to be a part of the decentralized market 200 which may be considered a "virtual private market" since only a selected number of participants are invited.

When the first or second participant 204 generates a transaction, (e.g., offers a particular commodity for sale to other participants 204), the originating participant 204 may determine what participants 204 are invited to the transaction. Unlike a centralized market 100 where offers for sale are given to all participants in the market, the originating participant 204 can determine who will be "invited" to the transaction and can customize transaction terms for each participant 204. Additionally, if a transaction is executed between the initiating participant 204 and another participant 204, the initiating participant 204 can control who, if anyone, is allowed access to the information from that transaction.

Another benefit of the decentralized market 200 is the flexible nature of the system. In a centralized market 100, if the central execution point fails and there is no functional backup, then no transaction can be executed. However, in a decentralized market 200, if one execution point 212 fails, executions can still be conducted at other execution points 212. Typically, only those transactions originating at the failed execution point are "lost" to the network.

Still another benefit of the decentralized market is that each execution point 212 is participant specific, not product specific. The loss of an execution point 212 means that only the participant 204 owning or associated with that execution point 212 is restricted from trading a specific product or products. In a centralized market, loss of an execution point restricts all trading in the product or products controlled by that execution point for all market participants.

In one embodiment of the present invention, the decentralized market 200 allows the participants 204 to selectively create "virtual private markets" for each transaction, enabling communication from the transaction specific execution point 212 to each "invited" market participant 204.

In accordance with one embodiment of the present invention, only members of the decentralized market 200 can be invited to a virtual private market. As a system prerequisite, the market network operator must grant participants 204 access to the network. Furthermore, the participants 204 may also be required to have internal clearance prior to participating in the decentralized market 200.

In accordance with embodiments of the present invention, the structure of the decentralized market 200 is termed as a "one-to-many, one-to-one" automated transaction structure. This unique structure allows the "holder" of the execution point 212 to broadcast transaction information to multiple market participants 204. The transaction participants may be selected from all available market participants when the transaction is originated. In accordance with one embodiment of the present invention, replies from any invited participant 204 are displayed only to the originating participant 204. In this manner, the decentralized market 200 allows the transaction to shift from being shown to many participants as is the case with a centralized market 100 to one between two specified counterparties.

As can be appreciated by one of skill in the art, the number of execution systems or points 212 does not necessarily need to equal the number of participants in the decentralized market 200. Rather, only one participant is required to have an execution system 212 in order to conduct a trade in the decentralized market 200. Furthermore, participants 204 may not necessarily have the execution system 212 reside on their premises. Instead, execution resources that perform the functionality of the application layer 208, execution system 212, and messaging system 216 may be borrowed from common computing resources such as servers from a pool of servers and temporarily allocated to the participant 204 thereby allowing the participant to engage in the decentralized market 200. The application layer 208, execution system 212 and messaging system 216 may be disaggregated and, in certain embodiments, the number of application layers 208, execution systems 212 and messaging systems 216 may not all be equal to each other.

Figure 3:
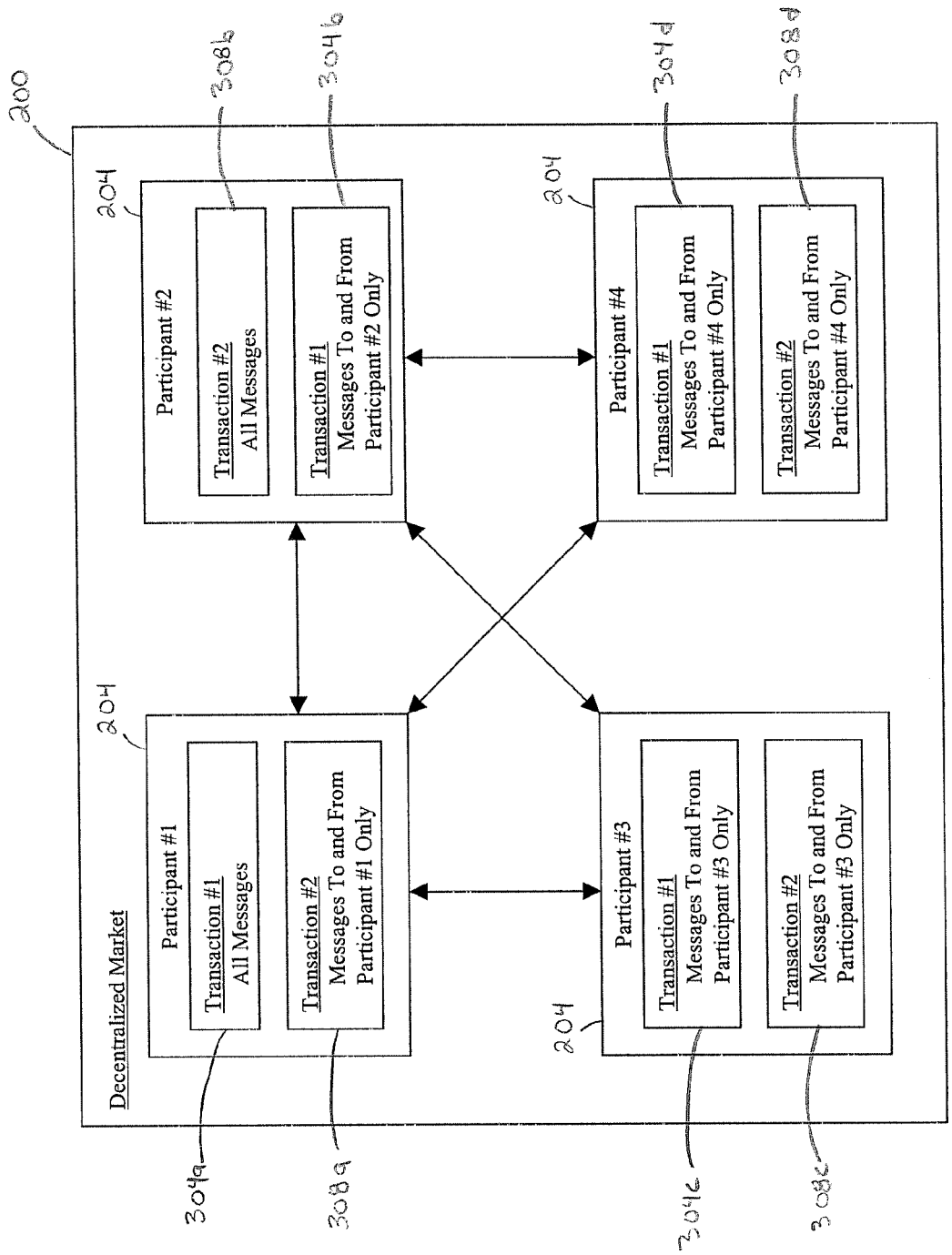
FIG. 3 is a block diagram depicting messaging permissions in a decentralized market in accordance with embodiments of the present invention.

With reference now to FIG. 3, the messages transmitted between participants in the decentralized market 200 will be described in accordance with embodiments of the present invention. More particularly, FIG. 3 depicts one embodiment of transactional information that each participant 204 is allowed to view with respect to all transactions in the decentralized market 200. In accordance with one embodiment, each participant 204 is only allowed to view messages that they have transmitted or received. The participants 204 are generally not allowed to view messages between other participants 204 unless those other participants allow their transaction to be transparent to the decentralized market 200. All participants 204 in the decentralized market 200 may comprise a first message section 304 for displaying messages sent/received in connection with a first transaction (i.e., a transaction originated by the first participant 204). Additionally, participants 204 may comprise a second message section 304 for displaying messages sent/received in connection with a second transaction (i.e., a transaction originated by the second participant 204). Certain embodiments of the present invention allow further restriction of the information displayed, though such information is still available to the participant if certain actions are taken.

In accordance with one embodiment of the present invention, since neither the third nor the fourth participants 204 originated a transaction, those participants 204 will not be able to communicate directly with one another. The first participant's 204 first message section 304a may display all messages related to the first transaction, since it was the first participant 204 that originated the first transaction. Similarly, the second participant's 204 second message section 308b may display all messages related to the second transaction, since the second participant 204 originated the second transaction.

The first participant's 204 second message section 308a may only display messages sent and received by the first participant 204 and will generally not include any messages between the second participant 204 and the third and fourth participants 204. Likewise, the second participant's 204 first message section 304b may only display messages sent and received by the second participant 204, since the second participant 204 was not the originator of the second transaction.

The third participant's 204 first message section 304c may contain messages related to the first transaction but only those messages that are transmitted between the third participant 204 and the first participant 204. Also, the second message section 308c may only contain messages between the second participant 204 and the third participant 204 as they relate to the second transaction. Furthermore, the first message section 304d and the second message section 308d of the fourth participant 204 may only contain messages sent and received by the fourth participant 204. The restriction of access to various messages within the decentralized market 200 allows participants 204 to trade with one party without worrying that a competitor may be able to see trade details. Of course, an originating participant may be able to selectively forward messages received from one counterparty to another counterparty in an attempt to promote bidding for a given product between the two counterparties. Accordingly, for example, the third participant 204 may receive messages that the first participant 204 received from the fourth participant 204 if the first participant 204 decides to forward the message on to the third participant 204. However, embodiments of the present invention may not indicate to third participant 204 that a message from first participant 204 was a message from the fourth participant 204 forwarded by first participant 204, though such indica can be provided.

Figure 4:
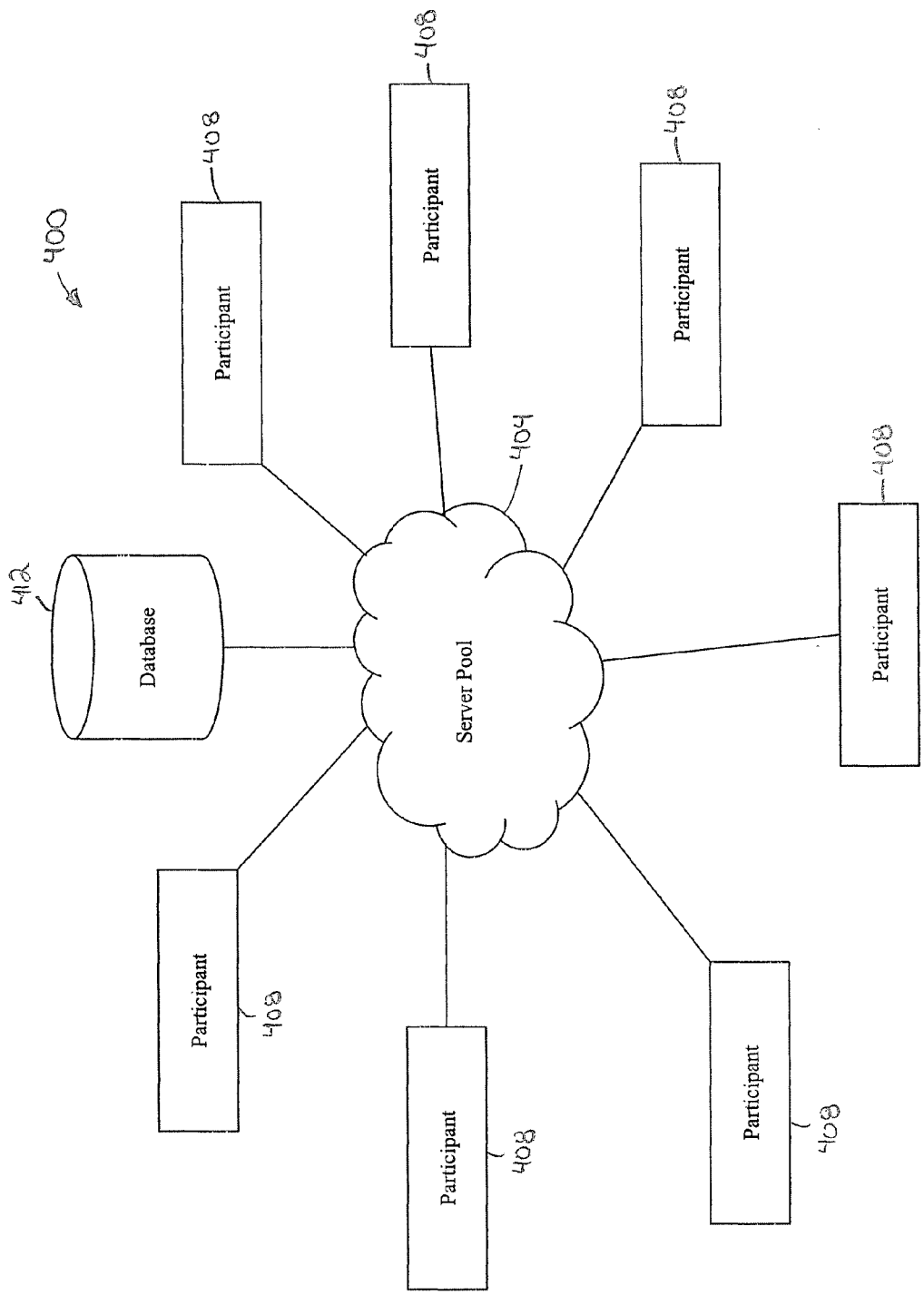
FIG. 4 is a block diagram depicting a cloud type decentralized market in accordance with embodiments of the present invention.

FIG. 4 depicts a cloud type decentralized market 400 where potential virtual private market participants 408 may selectively engage in transactions with other participants 408 by employing resources provided by the server pool 404 in accordance with at least some embodiments of the present invention. In the depicted embodiment, the decentralized market 400 has a number of participants 408 that are connected to a server pool 404. The connection to the server pool 404 may a wired or wireless connection or combinations thereof. In one embodiment, each participant 408 connects to the server pool 404 via a packet switched communication network such as the Internet. The participants 408 in this embodiment may have a local execution system 212. However, possession of such hardware is not necessary since participants 408 may borrow hardware resources from the server pool 404 to perform the functions of the application layer 208, execution system 212, and/or messaging system 216. More specifically, the server pool 404 may comprise a number of servers or dedicated resources that have the ability to prepare and execute trades in accordance with embodiments of the present invention. In such an embodiment, it can be appreciated that the server pool 404 may have an allocated messaging system coordinating the pool 404 resources to the participant messaging systems.

The participants 408 can request that resources from the server pool 404 be allocated for their use in originating transactions and/or in other trading activities. When resources are allocated from the server pool 404, the participant 408 may be provided with a token that indicates the location of the resources allocated to the participant 408 as well as the capabilities available to the participant 408. As long as the participant 408 is in possession of the token, no other participant 408 may be able to utilize the same resources. Accordingly, that participant 408 can maintain rights to the allocated resources until the participant 408 chooses to relinquish the token, at which time the resources are freed up for use by other participants 408 connected to the server pool 404. While resources are allocated to a given participant 408, that participant 408 appears to the decentralized market 400 as the participants 204 described in connection with FIG. 2. Moreover, in one embodiment, if the holder of the token is a first participant 204, the relinquishment of the token by that participant 204 shall automatically cause relinquishment of tokens related to that transaction by all other participants 204. More particularly, the participant 408 is able to originate transactions, negotiate transactions with counterparties, request and grant held orders, and execute transactions. The resources from the server pool 404 perform these functions on behalf of the participant 408 as long as the participant 408 retains possession of the resources. The interaction of the participants 408 with the server pool 404 may include the user of a web-based interface. Utilizing the web-based interface may be substantially similar to interacting with local hardware.

Transactional information, messages, and other records for an audit log for the participant 408 may be transmitted to a database 412 also connected to the server pool 404. The data associated with the participant 408 may be stored with an indicator showing the identity of the participant that has engaged in the transaction. Although only a single database 412 is depicted, one of skill in the art will appreciate that multiple databases 412 may be provided and such databases 412 may be positioned at various locations such that the storage of data is not dependent upon a single point.

Further to the idea of the decentralized market 400, the resources of the server pool 404 may also be physically separated (e.g., located in different states or countries), such that a single point of failure is avoided. Additionally, when participants 408 are assigned resources from the server pool 404, the location from which the resources are assigned may be based upon the current load at a given location as well as where other participants to a given virtual private market have their resources allocated from. For instance, if a participant 408 is requesting resources from the server pool 404, then an assignment algorithm may first determine what location has the least amount of resources assigned to other participants 408 and assign resources to the requesting participant 408 from that location. Furthermore, the assignment algorithm may determine what other participants 408 the requesting participant 408 is likely to interact with and assign the requesting participant 408 resources from a location that differs from the other participants. This further helps to eliminate a single point of failure for any virtual private markets that may be established. In other words, if the resources at a given location fail and the requesting participant 408 was provided resources from that location, then only that participant 408 will be affected. The other participants 408 can continue interacting with one another in the virtual private market and do not have to wait for the failed participant 408 to be assigned new resources. The only transactions that will be effected will be transactions that the failed participant 408 originated except in the specific instance of a "held order" granted to another participant 408. In the instance of a held order, only held orders granted to the failed participant 408 will be effected.

The database 412 may be employed to support backup and recovery procedures. The frequency of backup may vary depending upon the rate of the transactions for a given participant 408 as well as the enrollment level of the participant 408. In one embodiment, the backups may be performed nightly, although longer or shorter intervals of backup may be performed. During a backup procedure, information from all transactions performed and negotiated by a given participant 408 may be stored in the database 412 such that they can be recovered in the event that data is lost from the participant's 408 local storage. In one embodiment, a point-in-time restoration may be made possible using participant 408 journals. The journals maintain any transaction committed since the last backup until a failure occurs. When recovery from the failure begins, the data that is recovered from the backup files can be combined with the journal data to accomplish a full recovery of data. The journals may include all messages within a transaction or the last received/transmitted message for each transaction, depending upon the storage means available to the participant 408.

Figure 5:
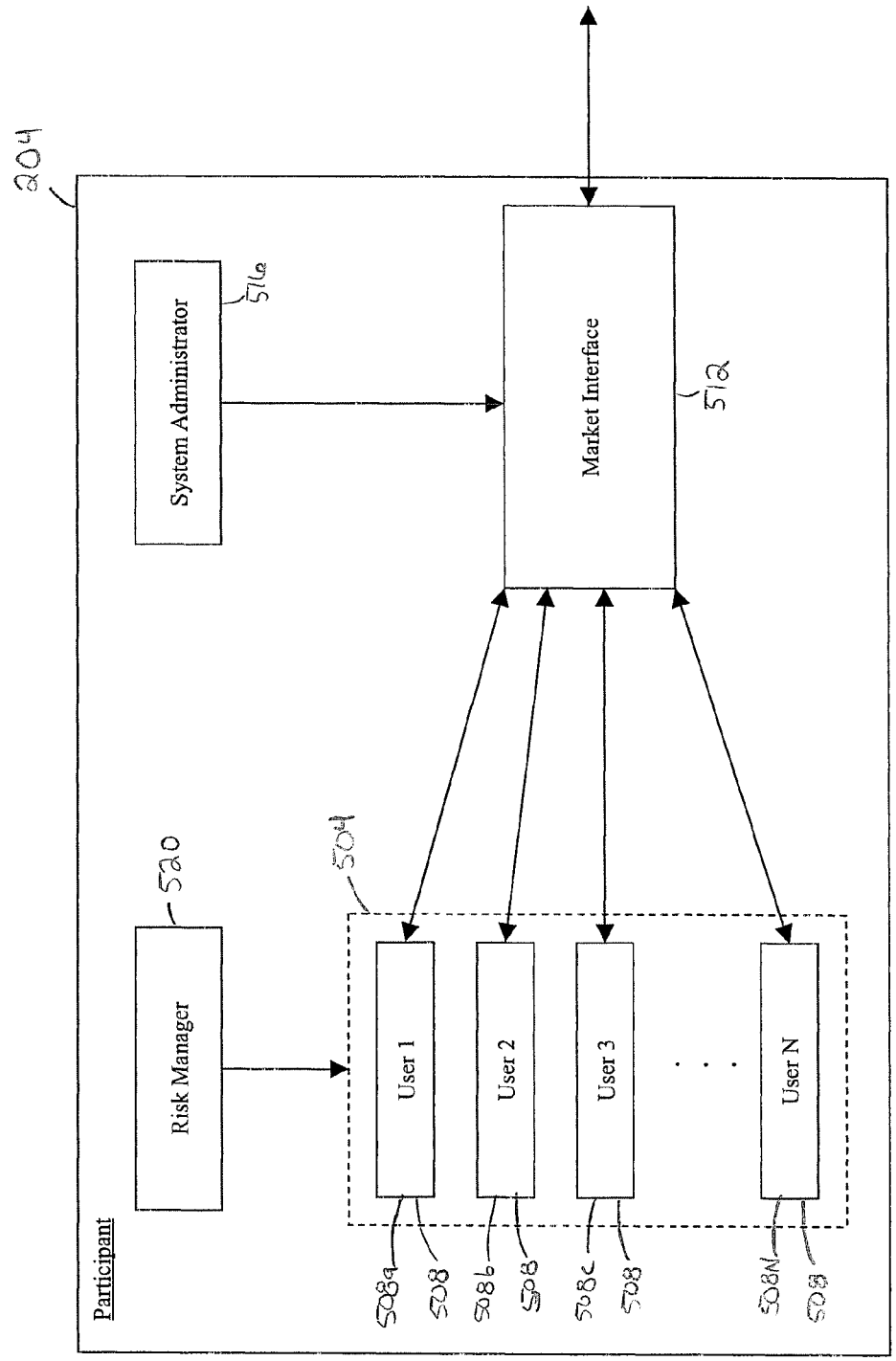
FIG. 5 is a block diagram depicting a participant or participant system administrator to a decentralized market in accordance with embodiments of the present invention.

FIG. 5 depicts an exemplary participant 204 structure in accordance with embodiments of the present invention. A participant 204 may represent an entire company or collection of individuals to the decentralized market 200. In other words, multiple individuals may trade on behalf of a single participant 204, and it is the participant 204 that is the representative entity in the decentralized market 200. However, all multiple individuals should be transacting under the authorizing contracts of the participant 204. In accordance with one embodiment of the present invention, restrictions on transactions to specified contractual relations are identical for all users 508 authorized by a participant 204 to transact on the participant's 204 behalf.

A participant 204 may include a set of users 504, where each user 508a-N interacts with other users 508 representing other participants 204. The number of users 508 that may be associated with a given participant 204 may vary from a single user to a large number of users 508. The users 508 do not necessarily need to be positioned at a common location. Rather, users 508 representing the same participant 204 may be spread across multiple locations. However, logically each user 508 is contained within the set of users 504 contained within the participant 204. A user 508 may interact with the decentralized market 200 via a user device such as a computer, laptop, server, Blackberry®, Personal Digital Assistant (PDA), or other types of processing/communication devices. The user's 508 device may be connected to a market interface 512 possessed by the participant 204. The market interface 512 may comprise a wired or wireless router, a switch, a server, or similar type of network interface module. The market interface 512 represents the user's 508a-N gateway to the decentralized market. The market interface 512 may be used to route transaction information to a given user 508 based on which user 508 has originated or is participating in a transaction on behalf of the participant 204.

Permissions associated with the market interface 512 may be controlled by a system administrator 516. In one embodiment, the system administrator 516 regulates the creation and default permissions of users. The system administrator 516 may be prohibited from participating in trade transactions. This precaution can be employed to prevent a user 508 from controlling his/her own permissions as well as the permissions of the entire participant 204.

The participant 204 may also include a risk manager 520 for controlling the permissions of the users 508 directly as well as managing trade risks by approving certain trades. In accordance with one embodiment of the present invention, the risk manager 520 controls a first set of permissions associated with the participant 204 while the system administrator 516 controls a second set of permissions associated with the participant 204. The first and second sets of permissions may be mutually exclusive such that the permissions of each controlling entity do not overlap within the context of the participant 204.

For example, the system administrator 516 controls the creation of a given user 508 on the system. More specifically, the system administrator 516 creates a user 508 identifier such that the user 508 is registered under the participant 204 with the decentralized market 200. When a user 508 is created for the participant 204, the default user permissions may be null, meaning that although the user 508 exists on the system, the user 508 is not allowed to trade. The risk manager 520 may control the trading permissions of each user 508 once the user 508 is created. The risk manager 520 assigns and revokes user 508 permissions based on user performance, experience, and/or perceived risk of allowing a user 508 permission to performs certain types of trades or such other determinations as the participant 204 may deem appropriate. Additionally, the risk manager 520 may control the counterparties that the user 508 is allowed to interact with, while the system administrator 516 may control the counterparties that the participant 204 is allowed to interact with. This separation of administrative powers helps to create a check and balance system that does not afford too many administrative powers to a single entity.

In accordance with one embodiment of the present invention, the risk manager 520 may be able to create and save user 508 classes or group settings by indicating a class name and specifying the default profile elements. The types of profile elements that may be defined by the risk manager 520 may include, trade type permissions, counterparty permissions, trade volume permissions, trade price permissions, held trade permissions, and so on. Examples of user classes that may be created by the risk manager 520 include, without limitation, a certain commodities trader, a short-term trader, a term trader, a super trader, and a trader in training. The risk manager 520 may also be able to modify user class profile elements. In one embodiment, the changes of a user class profile may only affect user profile assignments going forward, and not the permissions of users 508 previously assigned to the classes. The risk manager 520 can assign the users 508 to one or more of these classes thereby defining the user's 508 trading permissions.

In addition to assigning permissions to users 508, the risk manager 520 may be capable of managing the security roles and the relationships between users 508, the security roles, and the user 508 permissions. Role management may include creating, viewing, updating, deleting, and reinstating roles and associating permissions to those roles. In one embodiment, the risk manager 520 may not be allowed to associate two permissions to the same role where the permissions are flagged to be incompatible with each other. For example, a user 508 whom is able to initiate, respond to, and/or accept trades (i.e., a trader) should be restricted from performing any one of the following functions: view user 508 profiles; change user 508 profiles; restrict counterparties; view audit logs; view security logs; create new users; delete new users; add new counterparties; edit counterparty data; configure email recipients; and edit email recipients. The opposite should hold true as well, meaning that a user 508 with any of the above-identified permissions should not be allowed to perform any trading actions.

In accordance with embodiments of the present invention, the system administrator 516 may control the configuration of email recipients. Namely, the system administrator 516 may determine what persons associated with the participant 204 are allowed to and should be provided with certain trade information from the users 508. For instance, the system administrator 516 may determine that a CFO or CEO of the company should receive notifications when a trade of a certain magnitude occurs or when a held trade is granted. Furthermore, the system administrator 516 may be allowed to created a separate list of individuals outside of the participant 204 (e.g., possible counterparties or the like) that should receive notification related to certain transactions. In this way, the system administrator 516 may control the degree of transparency of trades executed by the participant 204. In one embodiment, the system administrator 516 may determine that no other parties outside of the participant should be allowed to see information related to executed transactions, thereby making all transactions performed by the participant 204 completely transparent. On the other hand, there may be some messages sent to various other participants (e.g., participants other than the counterparty to the transaction) when a certain transaction occurs, thereby making that transaction visible or non-transparent.

With reference now to FIGS. 6A and 6B, a virtual private market will be described in accordance with at least some embodiments of the present invention. A virtual private market is created with one participant 204 originates a transaction and sends an invitation to participate in the transaction to a selected sub-set of participants 204 corrected to the decentralized market 200. The originating participant 204 is referred to herein as the originator 604, while the invited participants 204 are referred to herein as counterparties 608. Since the originator 604 is able to determine the member of counterparties 608*a*-N, where N is greater than or equal to one, invited to participate in a transaction, the originator 604 is able to control the size of the virtual private market. The existence of the virtual private market is dependent upon the existence of an outstanding trade offer by the originator 604 or an outstanding counteroffer by one or more of the counterparties 608. So long as the original offer or a counteroffer is not executed the virtual private market will continue to exist. The virtual private market essentially reflects the privacy associated with the communications between participants 204 for a given transaction. In other words, the originator 604 does not necessarily need to share information sent to one counterparty with another counterparty. Furthermore, none of the participants in the virtual private market need to worry about information being disseminated outside of the virtual private market.

As can be seen in FIG. 6A, an originator 604 may send an offer to a number of counterparties 608. The offer sent to the counterparties 608 may be the same for each counterparty 608, in accordance with one embodiment of the present invention. In an alternative embodiment, the offers sent to counterparties 608 may vary and be specialized depending upon the counterparty 608. For example, the offer sent to the first counterparty 608*a* may differ from the offer sent to the second counterparty 608*b* in one or more respects. For example, the offer may vary in price, quantity, date of execution, required response period, and/or any other user 508 definable trade variable. Additionally, in accordance with embodiments of the present invention, the originator 604 may be allowed to trade multiple commodities on a single trade. The multiple commodities may be traded with a single counterparty 608 or with multiple counterparties 608 depending upon the originator's 604 needs. Examples of a multiple commodity trade that the originator 604 may be allowed to create is a trade for a power call with a gas call or a trade for a power future with a gas put. As can be appreciated by one of skill in the art after reading the present disclosure, many other combinations of multiple commodity trades can be envisioned. Additionally, in accordance with embodiments of the present invention, the originator 604 may be allowed to trade transaction components on a single trade. The multiple transaction may be traded with a single counterparty 608 or with multiple counterparties 608 depending upon the originator's 604 needs. Examples of a multiple transaction trade that the originator 604 may be allowed to create is a trade for a natural gas call with a natural gas put (of a differing or same strike price) or a trade for a natural gas purchase in April through October at one location with a natural gas sale in December through February at a differing location. As can be appreciated by one of skill in the art after reading the present disclosure, an almost infinite combination of multiple transaction component trades can be envisioned. This ability to create multiple commodity or multiple component transactions and to allow digital exchange of these components and manipulation of these components through the offer/counteroffer process is a unique feature of this invention and such ability is referred to as "complex trade" negotiation and execution.

In accordance with one embodiment of the present invention, the originator 604 may initiate a single transaction opportunity for multiple counterparties 608. If one of the counterparties 608 accepts the offer, then the offer to all other counterparties 608 may be revoked or otherwise terminated This particular type of association between offers in disparate transactions is created by logically linking each of the offers to one another such that when one offer is accepted, the other offers become unexecutable. Since the execution gate is generally maintained at the originator's 604 execution system 212, the implementation of a exclusivity of transaction is performed by limiting the execution system 212 to accepting only one of the linked transactions.

As can be seen in FIG. 6B, a number of counteroffers may be received by the originator 604 in response to the original offer. The counteroffers may be identified by the originator 604 and the receiving counterparty 608. For example, a counteroffer received from the first counterparty 608a may be identified as counteroffer 1-A, whereas a counteroffer received from the fourth counterparty 608d may be identified as counteroffer 1-B. Upon the counterparties 608 reply a thread is created. The thread connects the original offer with the counteroffer from each counterparty 608. The number of threads that an originator may have access to and be able to view could be equal to the number of counterparties invited to the virtual private market. For example, in the depicted embodiment of FIGS. 6A and 6B, if every counterparty 608 responds to the original offer, the originator 604 may have four different threads created one for each counterparty 608. The threads may be identified by the originator and counterparty similar to the way that a counteroffer is identified. Additions are made to a given thread if the originator replies back to the corresponding counterparty 608 or if the same counterparty 608 transmits additional messages or offers to the originator 604. Threads help to distinguish and maintain message order for the interactions between each pair of participants 204. Each of the threads may be separately stored in the database 412 for eventual incorporation into an audit log or security log file.

Figure 7:
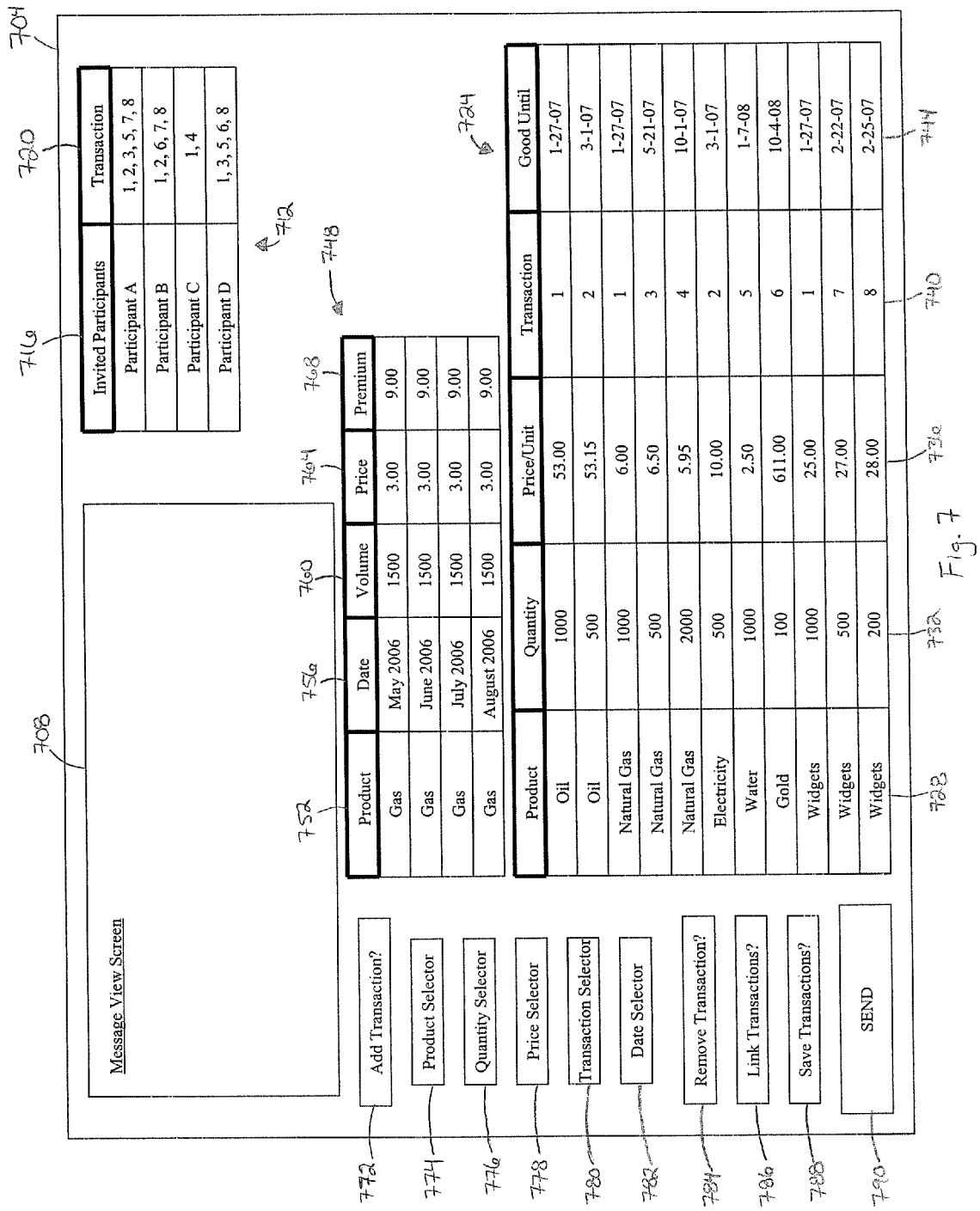
FIG. 7 is a screen shot of a trade originator's user interface in accordance with embodiments of the present invention.

FIG. 7 depicts a screen shot of an originator's 604 user interface 704 in accordance with embodiments of the present invention. As can be appreciated by one skilled in the art, a similar interface may be provided to counterparties 608 to trades regardless of whether the counterparty 608 has initiated a trade. The user interface 704 may include a message view screen 708 in accordance with at least some embodiments of the present invention. The message view screen 708 can be used to view messages or message threads from various counterparties with which the participant 204 is negotiating. Messages within the message view screen 708 may be filtered and sorted based on counterparty as well as transaction identification and receipt time. There may be an inbox within the message view screen 708 to view messages received by the participant 204 as well as an outbox to view messages transmitted by the participant 204. In accordance with one embodiment of the present invention, messages in the inbox and outbox portions of the message view screen 708 may be organized according to time or receipt and/or counterparty.

The user interface 704 may further include a current transactions table 712. The current transactions table 712 may identify the current outstanding actions that the user is currently engaged in. The transactions may include either offers originated by the participant 204 as well as transaction offers received by the participant 204. The content transactions table 712 may comprise an invited participants field 716 and a corresponding transaction identification field 720. The identity of each counterparty that is currently being negotiated with may appear in the invited participants field 716 whereas the transactions for the invited participant are identified in the transaction field 720. One participant may be identified in a single row while multiple transactions may be identified for the given participant. Alternatively, depending upon user preferences, a single transaction may be identified in a single row while multiple participants are identified for that transaction.

The user interface 704 may further comprise a detailed transaction information table 724. The detailed transaction information table 724 may include a product field 728, a quantity field 732, a price/unit field 736, a transaction identification field 740, and a clock or expiration field 744. As noted above, multiple commodity transactions are supported by embodiments of the present invention. For example, the first transaction may include offers for the trade of products such as oil, natural gas, and widgets (i.e., a manufactured good). The first transaction may have a single expiration time for all invited participants. Alternatively, the first transaction may have different expiration times for different participants. The transaction expiration time for each participant may be user defined and displayed in the expiration filed 744.

The user may select a given transaction in the transaction field 740 and all corresponding information on the user interface 704 related to the selected transaction may be highlighted for ease of location. For instance, information in the current transactions table 712 related to the selected transaction may be highlighted thereby identifying the participants that were invited to the selected transaction. A user can reference the data in the detailed transaction table 724 to determine what particular transactions are outstanding and whether the transactions have expired or not. The data in the detailed transaction table 724 may also be used to compare currently outstanding transactions to identify the most favorable transaction.

In addition to the detailed transaction information table 724, the user interface 704 may comprise a transaction selection table 748. The transaction selection table 748 may display information about possible trades that a participant 204 can engage in. The types of transactions displayed in the transaction selection table 748 may be controlled by various user inputs. For example, the existence of the transaction selection table 748 may depend on whether the user has selected an add transaction selector 772. When displayed, the transaction selection table 748 may include a product field 752, a date field 756, a volume field 760, a price field 764, and a premium field 768. Each of the fields may or may not be necessary depending upon the type of commodity or service that is being traded. The data displayed within the fields may vary depending upon what type of good the user it attempting to trade. To control the data displayed in the transaction selection table 748, one or more of a product selector 774, a quantity selector 776, a price selector 778, a transaction selector 780, and a date selector 782. Each of the selectors may comprise a drop-down menu when selected providing the user with options related to the engaged selector.

In accordance with at least some embodiments of the present invention, the date selector 782 may have a number of date options for trading a given commodity. The transaction selector 780 may comprise a number of transaction structure options for a given commodity. Examples of options that may be displayed in association with the transaction selector 780 include, but are not limited to, physical and financial commodity transactions. Examples of a physical transaction include, without limitation, consumer collars, producer collars, strip of consumer collars, strip of producer collars, custom consumer collars, custom producer collars, strip of custom consumer collars, strip of custom producer collars, forward, strip of forwards, options, strip of options, swings, and so on. Examples of a financial transaction include, without limitation, consumer collars, producer collars, strip of consumer collars, strip of producer collars, custom consumer collars, custom producer collars, strip of custom consumer collars, strip of custom producer collars, forwards, strip of forwards, options, strip of options, basis swaps, swings, and the like. The options of transactions available may vary depending upon the commodity being traded as well as the desired transaction date.

The variables related to a transaction may be adjusted using one or more of the selectors described above. In the event that the user wants to remove the transaction selection table 748, a remove transaction selector 784 may be engaged. If the user is happy with the format of a given transaction, then the user can utilize one or more of the link transaction selector 786, save transaction selector 788, and send selector 790. Engaging the link transaction selector 786 initiates a request to link the current transaction with other transactions thereby creating a one-cancels-others transaction. Selecting the link transaction selector 786 may present a drop-down menu of various transactions that the current transaction can be linked to.

The user can engage the save transaction selector 788 in order to save a given transaction for possible submission at a later time. The save transaction selector 788 may also be used to create a custom trade template. The custom trade template may correspond to a particular transaction that the user engages in on a relatively frequent basis and rather than inputting all of the transaction information, the user can pull up the custom trade template and save time in the creation of new transactions. The user may also be able to control whether the custom trade template is public or private. A public custom trade template may be used by other users associated with the participant whereas a private custom trade template is maintained for the creating user. It should be noted that the custom trade templates do not necessarily need to be completed, but can have a number of empty fields that are changed each time the custom trade is created. In accordance with one embodiment of the present invention, the custom trade template may be stored locally on the user device. Alternatively, the custom trade template may be stored on a shared storage drive or on the database 412.

When the user finally determines that the transaction is ready for transmission, the user can select the send selector 790. Once sent, a message will appear in the outbox on the message view screen 708 confining transmission of the transaction.

In accordance with one embodiment of the present invention, the risk manager 520 and/or the system administrator 516 is allowed to control the information available to the user interface 704 for any specific user 504. In this manner, in addition to the filtering capability available to any user 504 for its own user interface 704, the participant 204 can control the access to and manipulation of any transaction message between that participant 204 and any other participant 204.

Figure 8:
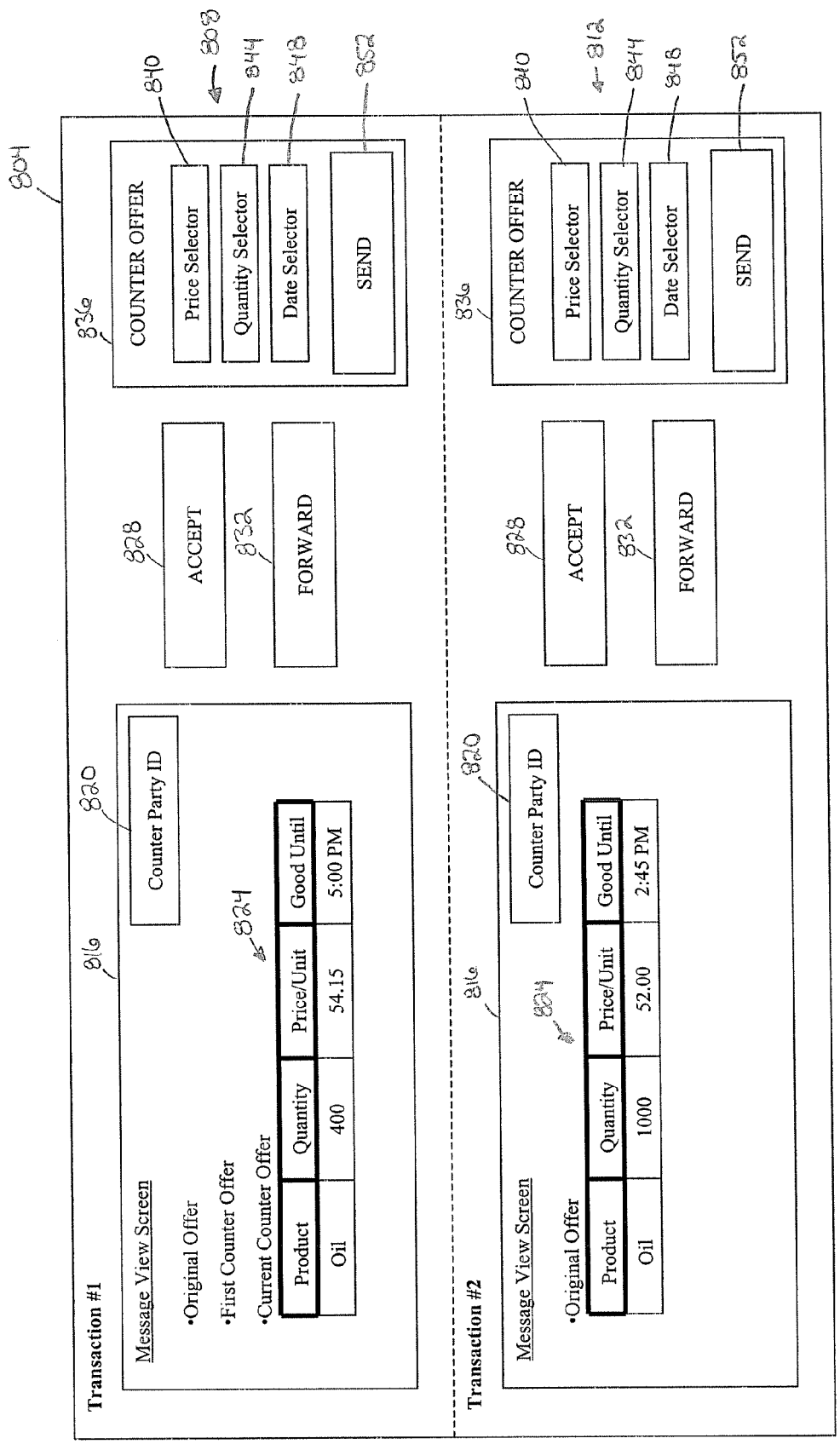
FIG. 8 is a screen shot of a trade counterparty's user interface in accordance with embodiments of the present invention.

FIG. 8 depicts a user interface 804 for participant that is reviewing one or more trades. As can be appreciated by one of skill in the art, the reviewing user interface 804 may be displayed along with the transaction preparation user interface 704. Alternatively, if a user does not have transaction origination permissions, then the user may only be presented with the reviewing user interface 804. The reviewing user interface 804 may comprise a number of transaction review sections 808, 812. The first transaction review section 808 may be dedicated to the presentation of data related to a first transaction while the second transaction review section 812 may be dedicated to the presentation of data related to a second transaction. Although two sections are depicted, the number of transaction review sections may be greater or less than two depending upon user needs, preferences, and the member of transactions the user is currently engaged in. In addition, the system can be embodied to make each transaction review section 804 transaction specific, requiring multiple transaction review sections 804 to review multiple transactions.

Each transaction review section may include a message review screen 816. The message view screen 816 may be used to display various message sent and received by the user. The message view screen 816 may be divided into an inbox and an outbox portion to help organize the offers that have been sent by the user as compared to offers the user receives. In one embodiment, messages may be displayed to the user in the order in which offers and subsequent counteroffers were created. Organizing the display in this fashion will allow the user to assess the condition of the trade and help in making decisions regarding possible counteroffers or acceptances. To further assist the user in making a decision regarding a current offer, the details of the most current offeror counteroffer may be provided in a trade details table 824. The trade details table 824 may include a product field, a quantity field, a price per unit field, and a good until field and such other fields as the current embodiment will allow. The types of fields included within the trade details table 824 may be user configurable and may also be based upon whether the most recent message was an offeror a counteroffer. The message view screen 816 may further include a counterparty ID field 820 for presenting the counterparty identifier that corresponds to the transaction.

The transaction review section may also include an accept selector 828 and a forward selector 832. The accept selector 828 and forward selector 832 may be engaged to either accept a given offeror to forward a received counteroffer to another counterparty. In accordance with one embodiment of the present invention, the originator 604 of an offer is the only party with permissions to forward offers on to counterparties. Additionally, the originator 604 may be restricted in the counterparties that the counteroffer can be forwarded to. More specifically, in one embodiment the originator 604 is only allowed to forward counteroffers on to participants that were original counterparties.

In addition to the accept 828 selector and the forward selector 832, a counteroffer section 836 may be provided. The counteroffer section 836 provided may include various selectors for creating and customizing counteroffers. In one embodiment, the counteroffer section 836 may include a price selector 840, a quantity selector 844, a date selector 848, and a send selector 852. The price selector 840, quantity selector 844, and date selector 848 may be used to adjust the various parameters of the counteroffer. Engaging the send selector 852 causes the counteroffer to be transmitted to the counterparty. Although not depicted, a reject selector may also be included in the types of selectors. In one embodiment, a rejection may be created by sending a rejection notice. The user may let an offer expire in lieu of rejecting the offer, or, alternatively, the system can be embodied to reject any offer upon alteration of any transaction parameter (e.g., price, term, volume, etc.) as designated by the participant 204 or such rejection may be included as an automatic action of the system.

It should be noted that the trade review screen 804 may be presented to the originator 604 as well as any counterpaities 608 to a trade. The amount of space on a display apparatus occupied by the trade review screen 804 may vary depending upon the number of transaction review sections.

Figure 9:
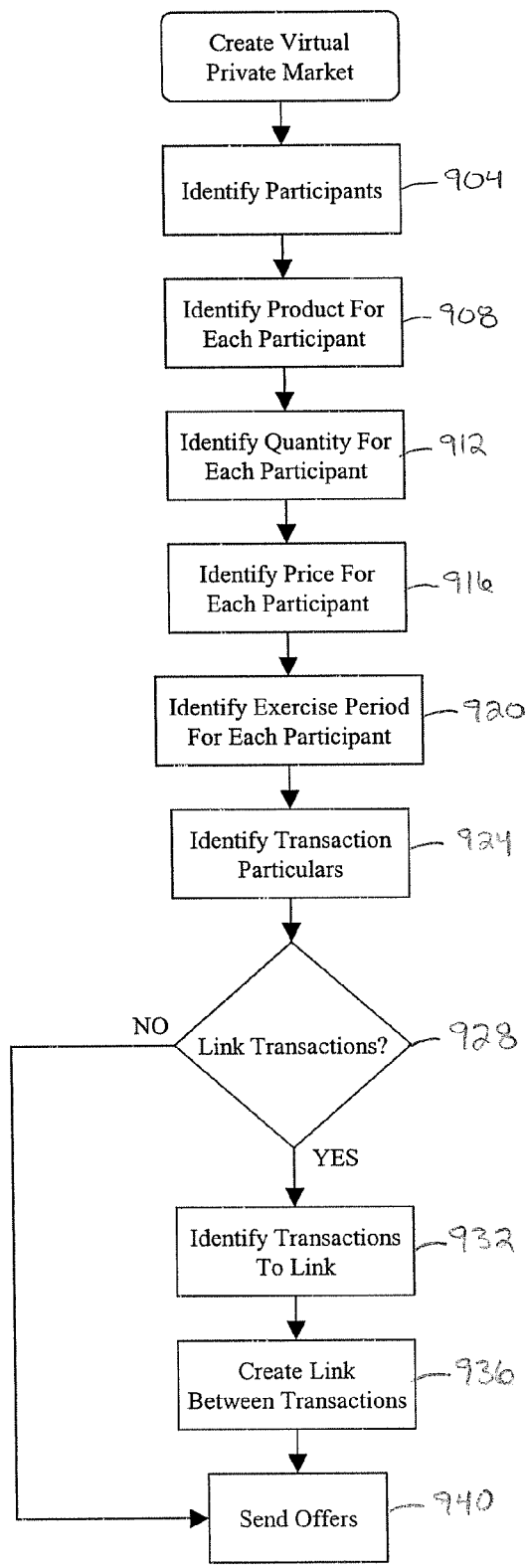
FIG. 9 is a flow chart depicting a method of creating a virtual private market in accordance with embodiments of the present invention.

FIG. 9 is a flow chart depicting a method of creating a virtual private market in accordance with at least some embodiments of the present invention. As noted above, a virtual private market may be created in response to the transmission of an offer and may exist for the duration of the transaction related to the offer. Initially, a virtual private market when market participants are identified (step 904). The originator 604 identifies the participants that are to receive the offer and thereby become counterparties 608. The counterparties may be dictated to a user representing the participant. In other words, a user may have permissions that define what participants the user is allowed to conduct transactions with.

After the counterparties 608 have been identified, the originator 604 identifies the products that will be offered for trade for each identified counterparty 608 (step 908). In addition to the product that is offered for trade, the originator 604 identifies the quantity of the product that will be offered for trade for each counterparty 608 (step 912). Further, the originator identifies the price, generally on a per/unit basis, for the product (step 916). In one embodiment, the originator 604 may desire a trade that includes offering each participant the same product at the same quantity and price. In this embodiment, the same offer may be transmitted to each identified counterparty 608. On the other hand, the originator 604 is provided with the option to create a single trade that differentiates products, quantities, and/or prices offered to one or more counterparties 608. In one embodiment, the originator 604 may elect to offer a different product for trade to each counterparty 608 for a given trade. Furthermore, the originator 604 may decide to offer different counterpaities 608 different prices. Different prices may be offered depending upon the counterparties 608 credit rating or other considerations. Additionally, different prices may be offered based on trading history and/or the quantity of product being offered. In accordance with one embodiment of the present invention, a lesser price may be offered for a greater quantity and vice versa.

Once the originator 604 has defined the parameters regarding the product being traded, the originator 604 then identifies the exercise period or expiration time for each counterparty 608 (step 920). Similar to the other parameters related to the trade, the expiration period may vary depending from one counterparty 608 to the next. In accordance with one embodiment of the current invention, the expiration period need not be set, creating an "indicative" transaction which is not executable but that may serve as the point of initiation of negotiations and the eventual setting of an expiration by a party to the transaction, thereby creating the executable transaction. Alternatively, the originator 604 may decide to offer all counterparties 608 the same expiration period. The expiration period is essentially the time in which the counterparty 608 will be allowed to accept the offer. After the expiration period, rights to acceptance are revoked and the offer dies. In one embodiment, the expiration period is set and a countdown clock begins counting down to the end of the expiration time at the time the offer is transmitted.

The final parameter that may be determined by the originator 604 is the transaction type (step 924). The types of transactions may include collars, options, puts, forwards, swings, swaps, and the like. Again, the types of transactions offered to various counterparties 608 may vary depending upon the originator's 604 discretion.

With the parameters relating to the offer are defined, the originator 604 is provided with the option of linking the offers in the current transaction with other transactions with a differing transaction identification sent to each counterparty 608, or differing counterparties 608 (step 928). In other words, the originator 604 may decide to create a one-cancels-others type of trade.

In the event that the originator 604 wants to link the transactions, the originator 604 is requested to identify the transactions that should be linked (step 932). When the transactions are identified, the transactions are linked thereby creating a logical connection between the transactions (step 936). The link between the transactions connects the transactions together such that if an offer associated with any of the linked transactions is exercised, then all other offers with all of the linked transactions are revoked thereby making only one offer executable. Linking the transactions may cause a pointer to be created between the various transactions that identifies that the execution of a separate transaction may cause the indicated transaction to become unavailable. In accordance with one embodiment, the pointer may be used as an indication that the other offers or at least the other counterparties 608 will be affected by the execution of the current transaction. When one transaction is executed the pointer is activated and all other transactions and their associated offers are identified and revoked. After the transactions are linked or if no link is desired, the offers for the specific transaction are transmitted to the identified counterparties 608 (step 940). When the offers are sent, the virtual private market is created and defined by the originator 604 and the counterparties 608.

In accordance with one embodiment of the present invention, the trade parameters defined for a given transaction is the same for all invited counterparties 608 in the first message. In other words, the original offer for each counterparty 608 to a given transaction will be the same. Of course, the counteroffers created in response to the first offer may vary from counterparty 608 to counterparty 608. If the originator 604 desires to create different trading terms for different counterparties 608, then the originator 604 may create different transactions for each counterparty 608 and link those transactions together, thereby making the transactions behave similar to a number of offers associated with a single transaction.

Figure 10:
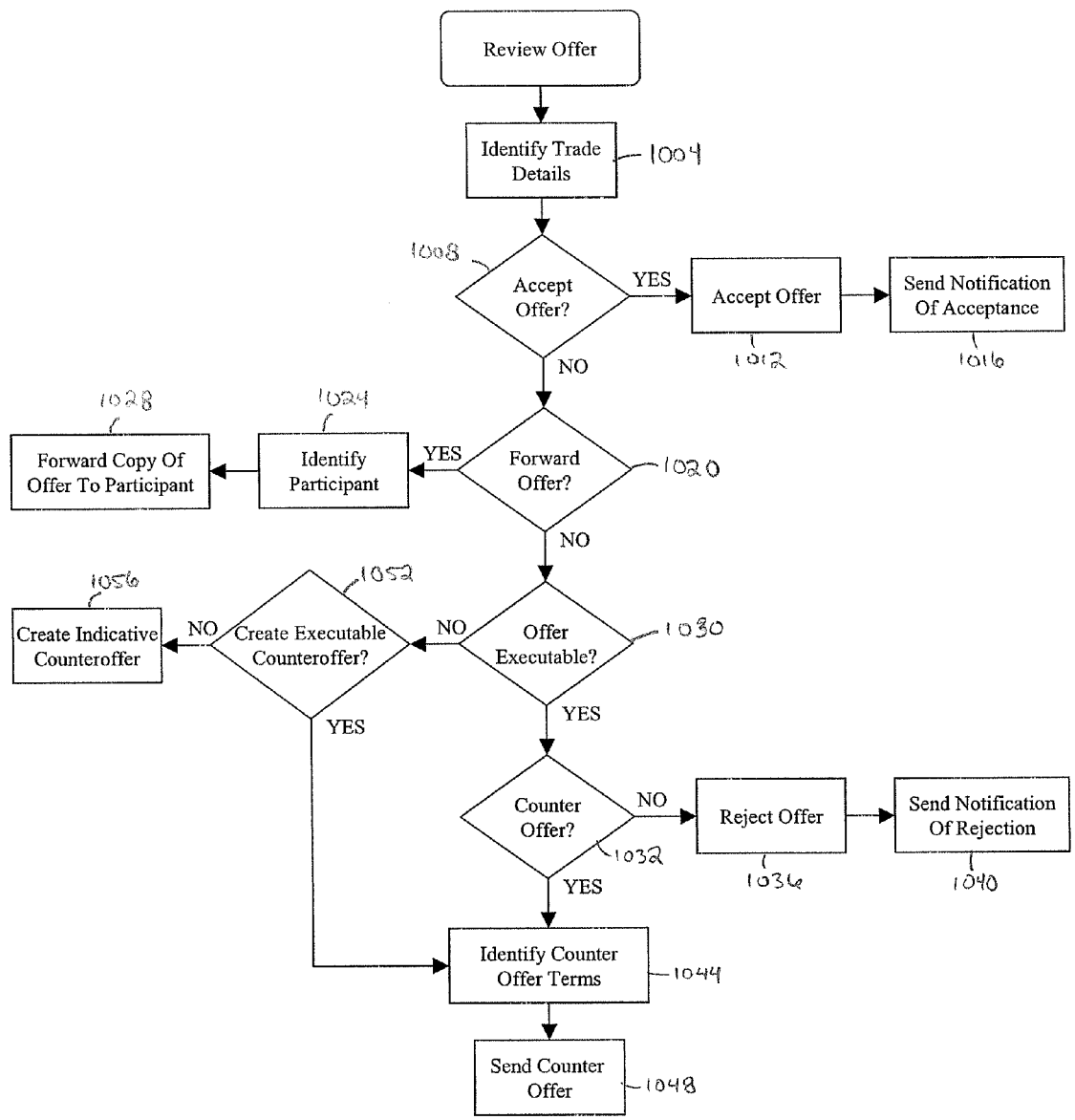
FIG. 10 is a flow chart depicting a method of reviewing an offer in accordance with embodiments of the present invention.

FIG. 10 depicts a flow diagram outlining a method of reviewing a received offer in accordance with at least some embodiments of the present invention. The method begins when the trade details associated with the offer are identified (step 1004). The offer being reviewed may be an original offer received by a counterparty 608 or a counteroffer received by an originator 604. The trade details may be presented to the reviewing party via a trade review screen 804 or the like. Based on reviewing the trade, the reviewing party is given the option of accepting the offer (step 1008). If the reviewing party decides to accept the offer, then the method continues with the reviewing party accepting the offer, possibly by engaging the accept selector 828. Acceptance of an offer is completed with a transmission of an acceptance notification to the offeror (step 1016). The acceptance of an offer is generally regarded as consent to all terms of the offer, including all parameters associated therewith. If any of the parameters of an offer are adjusted, then acceptance is made impossible. Instead, changing terms of an offer is regarded as a counteroffer, in accordance with at least one embodiment of the present invention. In accordance with one embodiment of the present invention, execution of an acceptance is defined as the receipt of the acceptance notification at execution system 212 of the originating participant 204 or execution system 212 of the grantee of a held order. Alternate rules for receipt of the acceptance notification at differing locations than those specified above can be allowed by the present invention.

In the event that the reviewing party does not want to accept the offer, then the method continues to determine if the reviewing party would like to forward the offer to other parties (step 1020). The present invention can incorporate various methods for the determination of desire not to accept the offer can be made by affirmative action, by implicit action or by alteration of transaction data specific fields of a trade review screen 804. As noted above, the right to forward offers to other parties is typically reserved for the originator 604, although certain embodiments of the present invention may afford a counterparty 608 the ability to forward an offer to other parties or to convert an offer into a new transaction for an additional transaction in a separate virtual private market.

If the reviewing party decides to forward the offer to another party, then the reviewing party identifies the participants that are to receive the forwarded version of the offer (step 1024). In this step, the reviewing party may be limited to the participants that received the original offeror the embodiment may require, and enable, the creation of a new virtual private market for such forwarded offer (e.g., in the case where the reviewing party is not the originator 604). Furthermore, the restrictions on the reviewing party may be determined by the role of the reviewing party (i.e., originator 604 or counterparty 608). Once the recipient parties have been identified, the method continues by forwarding a copy of the offer to the identified parties (step 1028). In one embodiment, an exact copy of the offer may be transmitted to the identified parties. Alternatively, the forwarding party may decide to redact certain portions of the offer and only forward a partial copy of the offer to the other participants.

If the reviewing party decides not to forward the offeror accept the offer, then it is determined if the offer is executable (step 1030). There may be circumstances where an offer is only being used to initiate negotiations rather than as the submission of a formal offer. An offer transmitted without a clock is generally referred to as a non-executable (or "indicative") offer and is therefore unavailable for acceptance; any other action, such as extending an indicative or executable counteroffer, can be taken in response to an indicative offer. If the offer is executable, meaning that it does have a clock (or such other indicator of executable status as may be utilized by the system), then the reviewing party may be given the alternative to create an executable counteroffer (step 1032). If the reviewing party decides that a counteroffer is not desirable, then the reviewing party has essentially made the decision to reject the offer (step 1036). Rejection of the offer may be made explicit by sending a rejection message to the offeror (step 1040). On the other hand, the reviewing party may simply let the offer expire, in which case the offeror may not receive notification. Of course, if the offer has not yet expired, then the reviewing party may still have all of the options described in connection with FIG. 10, depending on the actions taken during review of the offer.

Referring back to step 1030, if the offer is not an executable offer, then it is determined if the reviewing party wants to create an executable counteroffer (step 1052). An executable counteroffer may be created even in response to a non-executable offer. The executable counteroffer would include terms of the counteroffer as well as a clock that is used to determine when the counteroffer expires. If the reviewing party does not want to create an executable counteroffer, then the reviewing party may still create a non-executable or indicative counteroffer (step 1056). An indicative counteroffer represents further negotiations between the reviewing party and the opposite party, without creating the mechanism that would allow execution of a transaction.

In the event that the reviewing party elects to submit an executable counteroffer either in response to an executable or non-executable counteroffer, then the reviewing party is allowed to identify the terms of the executable counteroffer (step 1044). Adjusting one or more parameters of the offer generally constitutes a counteroffer, unless certain customs of the trade (or user preferences) allow slight modifications of an offer (e.g., delivery time) during acceptance. The reviewing party can adjust the terms of the counteroffer by engaging the various selectors provided in connection with the counteroffer section 836. Embodiments of the present invention may contain restrictions on what portion or portions of the offer may be altered such as constraining the counteroffer to only contain transaction components included in the original offeror constraining the ability to change delivery locations or times. Once the terms of the counteroffer have been defined, the method continues with the transmission of the counteroffer (step 1048). In this step, the reviewing party may engage the send selector 852, at which point the offeror/offeree roles of the parties switch, and the previous offeror becomes the offeree and is allowed to review the counteroffer.

Figure 11:
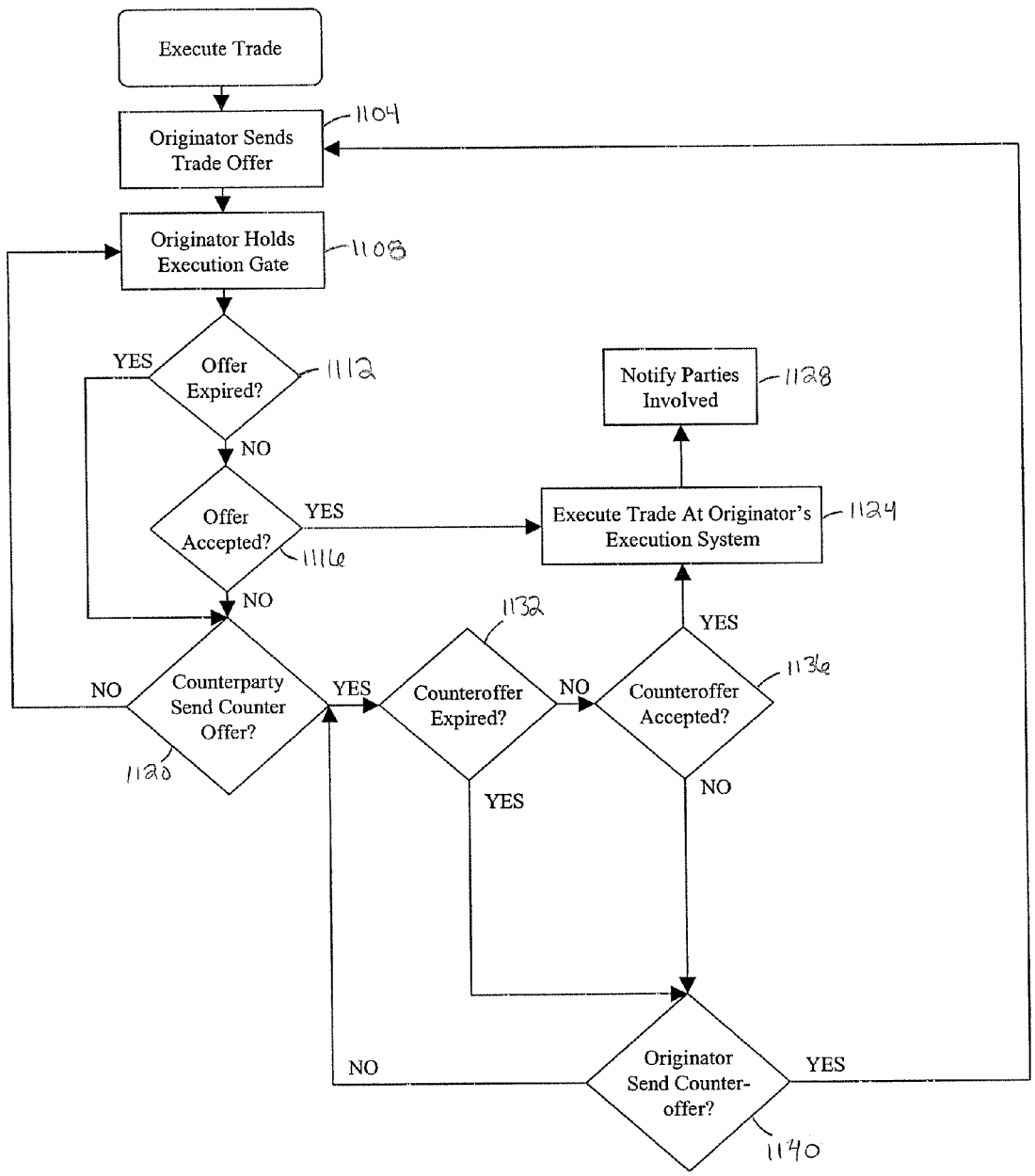
FIG. 11 is a flow chart depicting a method of executing a trade in a decentralized market in accordance with embodiments of the present invention.

FIG. 11 depicts a method of executing an offer in a decentralized market in accordance with at least some embodiments of the present invention. The method begins when the originator 604 sends a trade offer to one or more counterparties 608, thereby creating a virtual private market (step 1104). When the originator 604 transmits the offer, the execution system 212 associated with the originator 604 is given the execution gate (i.e., execution permissions) (step 1108). During the allocation of the execution gate, a clock time is set relating to the defined life of the execution gate. The clock time may be set for a specific member of a virtual market (i.e., in the case of an originator 604), for all members of the virtual private market (i.e., in the case of an originator 604), or only for the originator (i.e., in the case of any counterparty 608). In accordance with one embodiment of the present invention, only a single execution system 212 is allowed to hold the execution gate or execution permissions for a given transaction at a time. This prevents the double execution of a single trade. In accordance with at least some embodiments of the present invention, the originator's 604 execution system 212 maintains the execution gate throughout the life of the virtual private market unless a held order is granted by the originator 604. Assigning only one execution system 212 the rights to execute a given transaction may be considered assigning an execution system 212 of record. The execution system 212 of record is the sole execution system 212 with the permissions to execute a given transaction. Therefore, each offer and subsequent counteroffer may contain a dedicated bit identifying the execution system 212 of record. When a party accepts an offeror counteroffer, the identification bit is referenced to determine if the transaction can be executed at the current execution system 212, or if notification of the acceptance needs to be transmitted to the execution system 212 of record for execution.

Accordingly, after the execution system 212 of record is identified, the method continues by determining if the offer has expired (step 1112). Reference to an expiration clock or similar type of count down device may be included in this step. An offer expires when no clock time is left (i.e., the clock is set to zero). In one embodiment, the offer has a timer associated with it, such that when the acceptance period expires, the offer automatically self-destructs or self-disables and the embodiment may or may not remove the transaction from the system and close all execution points. Alternatively, upon determining that the offer has expired, a second message may be transmitted each of the counterparties 608, whereby the second message causes the offer to become unacceptable. In addition to rendering the offer unacceptable, the execution gate may be disabled from executing the expired transaction.

If the offer has expired, then acceptance of the offer is made unavailable, still, however, a counteroffer may be created in response to an unavailable offer. An offer may also made unexecutable if it has already been executed or withdrawn, in which case the offer is killed rather than rendered unavailable. Therefore, if the offer has expired, the method skips step 1116 and continues to step 1120, where it is determined if a counteroffer will be created.

Referring back to step 1112, if the offer has not expired, then the determination is made as to whether the offer has been accepted (step 1116). This determination may be made when the originator 604 receives a message from one of the counterparties 608 indicating acceptance of the offer. Alternatively, a message may be sent directly to the execution system 212 associated with the originator 604 requesting execution of the transaction. In either event, if the offer is determined to be accepted, then the trade is executed by the execution system 212 associated with the originator 604 or, alternatively, whatever execution system 212 is currently the execution system 212 of record (step 1124). In other words, the execution of the trade may occur at hardware owned or leased by the originator 604 or the trade may be executed at server resources allocated to the originator 604. Once the trade has been executed, the parties involved may be notified that the transaction is complete (step 1128). In accordance with at least some embodiments of the present invention, the parties that receive the notification may be limited to the originator 604 and the accepting counterparty 608 and the system may require that notification be sent to more than one individual, such as the risk manager 520 and the system administrator 516, at the originator 604 and accepting counterparty 608 regardless of the actions of the actions of the user 508 that generates the message allowing execution of the trade at originator's execution system 1116. Alternatively, the originator 604 may allow the notification to be made partially public by sending the notification to one or more parties that were not involved with the transaction. However, the decision regarding which additional parties receive the notification beyond those involved in the transaction may be left to the discretion of the originator 604.

In addition to sending messages to winning parties (i.e., parties engaging in the transaction), messages may be sent to non-winning parties indicating that the offer is being revoked. The message sent to non-winning parties may include a script that does not allow the counterparty's (the party opposite the originating party) execution point to complete the transaction or may just indicate that the originator's execution point will no longer accept an execution message. The message sent to non-winning parties may also be created such that it is indistinguishable from other messages that otherwise force a transaction to become unavailable (e.g., transaction recall messages and the like). This enables the originating execution point to mask transaction executions because messages may be sent to all potential participants. A subset of the potential participants may have executed the transaction and another subset may not have executed the transaction. The subset that executed the transaction may receive a first type of message that verifies the transaction was executed and the other subset that did not partake in the transaction may receive a second type of message that notifies the non-winning parties that no transaction has occurred. This way third party observers cannot determine which party participated in a transaction based on them receiving a message or not. In the event that more than one participant was invited to partake in the transaction and they subsequently executed a transaction with the originating participant, the originating participant's execution device will generate and send a message to each of the participants that completed a transaction. The message sent to each participant will be unique to the transaction that occurred between the originating participant and the subject participant. The originating participant will be able to maintain a record of all transactions that have occurred at their respective execution device, and the same holds true for other participants. This allows the originating participant to keep information related to the originated transaction somewhat confidential. In other words, all other participants in the system do not necessarily have the ability to view information related to the entire transaction, even if they participated in the transaction. Of course, the originating participant may change the access rights of other participants, thus allowing participants other than those involved in the transaction to view some or all details related to that transaction.

If the offer has not yet expired and has not been accepted, then the method continues by determining whether the counterparty 608 has transmitted a counteroffer (step 1120). If no counteroffer has been received, then the method returns back to step 1108, where the system 212 of record is maintained by the originator 604.

On the other hand, if a counteroffer has been received, then it is determined if the counteroffer has expired (step 1132). If the counteroffer has expired or was simply an indicative counteroffer, then the counteroffer is made unavailable. With the counteroffer being unavailable, the originator 604 is given the choice to send a second counteroffer (step 1140). Of course, if the offer has been withdrawn and killed, then the originator 604 cannot create a counteroffer, but rather must create a new offer in the instance of a withdrawn offer or create an entirely new transaction in the case of a "killed" transaction.

If the counteroffer has not expired, then the originator 604 has the right to accept the counteroffer (step 1136). In accordance with one embodiment of the present invention, when a counteroffer is created the previous offer is terminated thereby making the previous offer unacceptable. This results in the counteroffer being the only acceptable offer for a given trade. If the counteroffer is acceptable to the originator 604, then the method continues by executing the trade at the execution system 212 associated with the originator 604 (step 1124). As noted above, the acceptance of a counteroffer by the originator 604, may result in the execution of the trade without first transmitting a notification message to the counterparty 608, since the execution system 212 of record is maintained by the originator 604.

However, if the originator 604 does not accept the counteroffer, then it is determined if the originator 604 has created a counteroffer to the original counteroffer (step 1140). The opposing side may subsequently counteroffer each received counteroffer until either an agreement is reached or until a counteroffer expires. This allows the parties to negotiate with one another until terms are acceptable to both parties. In accordance with at least some embodiments of the present invention, the execution of an offer is done when either the originator 604 or the counterparty 608 makes an affirmative action to accept an offer. Unlike central exchange systems it is not necessary for the network to receive both a bid (affirmative message to buy) and an offer (an affirmative offer to sell) from two parties at prices and terms that are mutually acceptable. Embodiments of the present invention incorporate the affirmative action of either the originator 604 or the counterparty 608 as the central and only necessary determination of execution. If the originator 604 does not submit a counteroffer, then the method returns to step 1132, where it is determined if the original counteroffer has expired. Otherwise, the method returns to step 1104 where the originator 604 transmits the terms of the new offer (i.e., the new counteroffer) to the counterparty 608.

Figure 12:
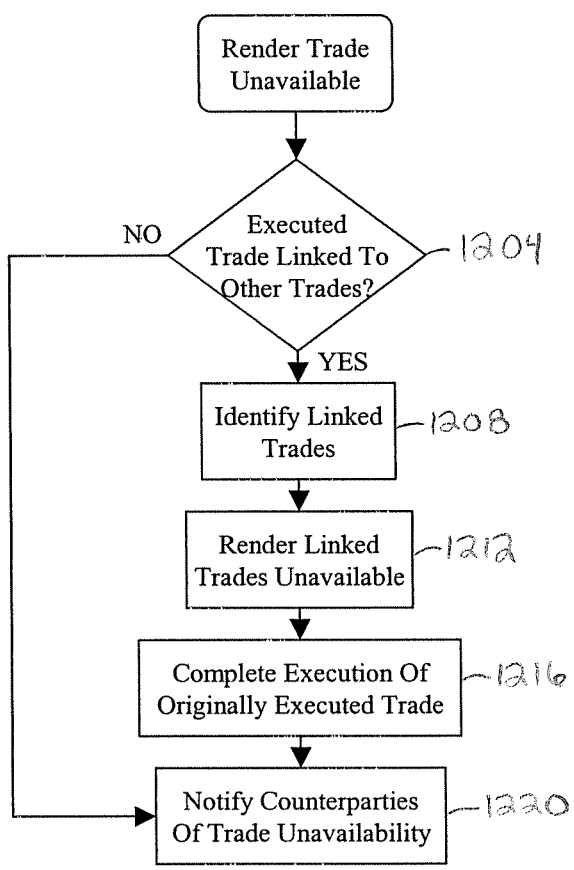
FIG. 12 is a flow chart depicting a method of executing a one-cancels-other transaction in accordance with embodiments of the present invention.

Referring now to FIG. 12, a method of rendering linked trades unavailable in association with a one-cancels-others type trade will be described in accordance with at least some embodiments of the present invention. Initially, a determination is made as to whether an executed trade or transaction is linked to other trades or transactions (step 1204). In one embodiment, it is possible that the link may exist between offers in the same virtual private market, however, certain embodiments may only support links between different transactions (i.e., different virtual private markets). In accordance with one embodiment of the present invention, links are created at the transaction level, rather than at the offer level, where a transaction may comprise a plurality of offers. However, the possibility of creating links at the offer level is possible according to embodiments of the present invention. The link may also exist between different offers in different virtual private markets. In other words, an originator 604 may elect to create an offer for one virtual private market (i.e., a first set of counterparties 608) and link that offer with another offer for another virtual private market (i.e., a second set of counterparties 608). The different virtual private markets may comprise one or more different counterparties 608 or may comprise the same counterparties 608 that are being presented with different transactions.

If it is determined that the executed trade is linked to at least one other trade, then the method continues by identifying the linked trades (step 1208). The linked trades may be identified by pointers between the linked trades or by referencing a data storage area such as the database 412. Once the linked trades are identified, the linked trades are rendered unavailable or at least unexecutable by any system, including the execution system 212 of record (step 1212), in the event of execution of any one of the linked trades on any execution system 212 of record associated with any individual linked trade. In one embodiment, all unexpected linked trades may be rendered unexecutable by actually revoking the linked trades upon execution of any one of the linked trades on any execution system 212 of record associated with any individual linked trade. In an alternative embodiment, the identity of linked trades are maintained in the execution system(s) 212 of record of any linked trade such that the execution system(s) 212 of record does not execute any remaining linked trades upon execution of any one of the linked trades on any execution system 212 of record associated with any individual linked trade. The current embodiment of the present invention constrains linked trades to those transactions residing on the same execution system 212 of record. This requires that all linked transactions must be placed on the same execution system 212 of record upon designation of linkage by the originating party 204

After the linked trades have been made unexecutable, the originally executed trade is executed (step 1216). As noted above, the execution of the trade may occur at the execution system 212 associated with the originator 604. Alternatively, the execution of the trade occurs at the execution system 212 of record wherever the transaction to be executed resides.

After the trade has been executed, the appropriate counterparties 608 are identified and notified of the trade (step 1220). The notification of the various counterparties 608 may include transmitting a revoked offer message or by causing the offer within the counterparties' 608 inbox to disappear or display an error message if further acceptance is attempted.

Figure 13:
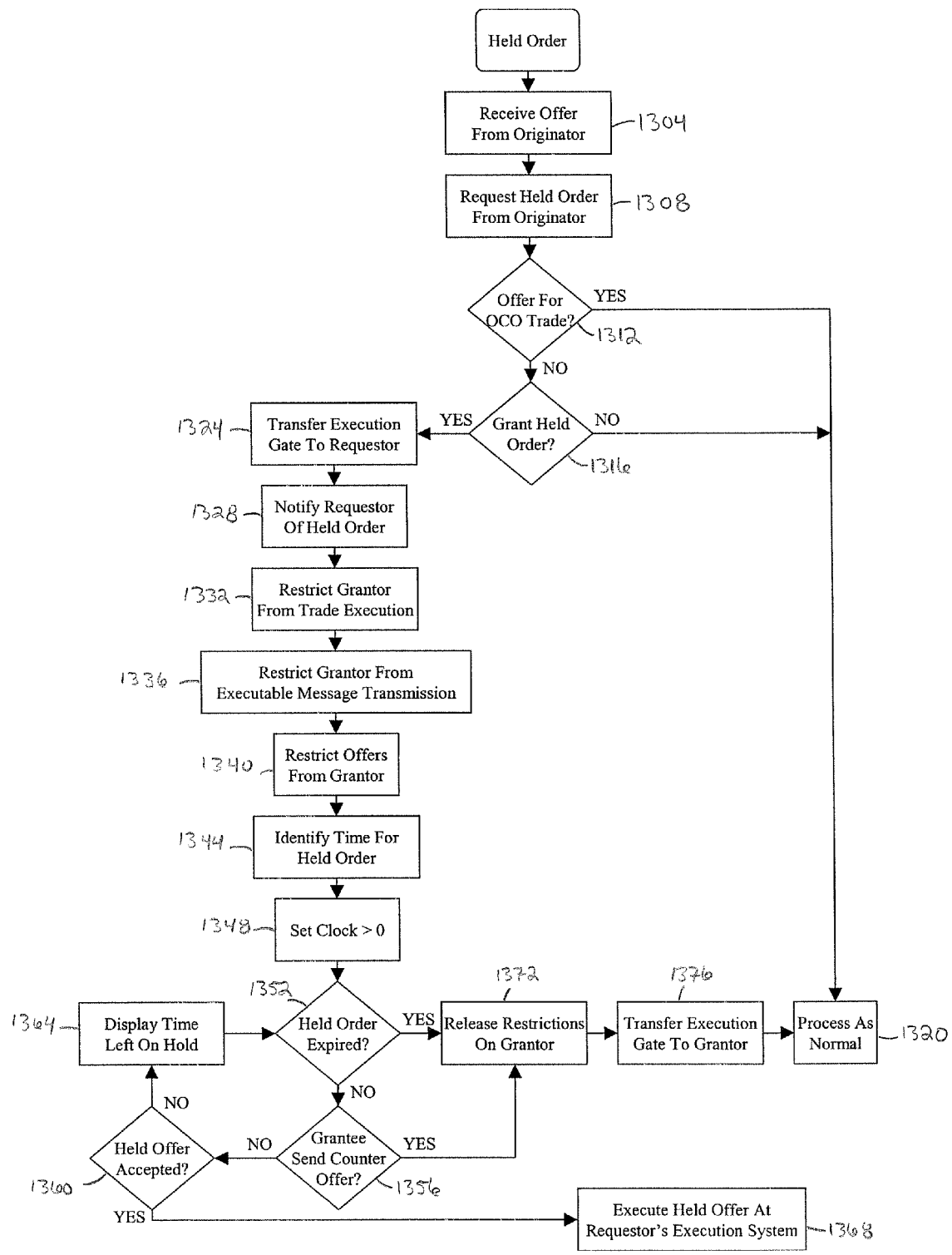
FIG. 13 is a flow chart depicting a method of creating and executing a held order in accordance with embodiments of the present invention.

FIG. 13 depicts a method of completing a held order in accordance with at least some embodiments of the present invention. A held order is originated when an offer is received from an originator 604 or a counteroffer is received from a counterparty 608 (step 1304). Upon receiving the offeror counteroffer, a request for a held order is submitted (step 1308). The request for a held order is typically requested by a counterparty 608 of an originator 604. However, certain embodiments exist where an originator 604 may request a held order from a counterparty 608.

Thereafter, it is determined whether the subject offer is incorporated in a one cancels others (OCO) type trade (step 1312). If the offer is associated with a one cancels others type trade, No—then all execution systems 212 of record must be identified. In the event that a held order is granted (step 1316) for an OCO linked transaction, then execution of all other linked OCO trades on all other execution systems 212 of record shall be disabled for the period of the held order and the execution gate shall be transferred in accordance with step 1324, as described below.

However, if the offer is not linked to other offers as a part of a one cancels other trade, then it is determined if the request for a held order has been granted (step 1316). In other words, the offer originator (although not necessarily the virtual private market originator 604) is presented with an opportunity to grant the held order. It is the right of the originating user to determine if he/she is willing to forego temporary rights of executing their offer. If the request for held order is not granted, then the offer proceeds as normal (step 1320). The originator may not have the permissions to grant a held order, in which case the request for a held order is automatically denied. Alternatively, the originator may decide not to grant the held order even though the originator possesses the permissions to do so. In one embodiment, the grantor is allowed to change only the clock and no other trade parameters when granting a held order.

Conversely, if the request for held order is granted, then the execution system 212 of record (i.e., the execution gate) is transferred to the requestor (step 1324). In this step, an execution token may be transferred from the grantor's execution system 212 to the requestor's execution system 212.

Once the execution gate has been transferred to the requestor's execution system 212, then the requestor is notified that a held order has been granted (step 1328). The notification may be transmitted as an additional message to the requestor and/or by the presentation of a new held order window to the requestor. By granting a held order option to the requester, the grantor is allowing the requestor of the offer the right to exclusively execute with the offeror for a specified period of time. Accordingly, after the requestor has been notified, the grantor is restricted from trade execution (step 1332). Furthermore, the grantor may be restricted from any message transmissions (step 1336). This precludes the grantor from interacting with other counterparties 608, thereby upholding the rules associated with a held order. However, in one embodiment the grantor can communicate with other counterparties but cannot send a counteroffer with a clock thereby making the counteroffer executable. In accordance with still another embodiment, the grantor may only be restricted within the virtual private market that he/she has granted the held order in. The granter may still be allowed to execute transactions from other virtual private markets.

The grantor may also be restricted from creating any other executable offers for other counterparties 608 while the held order exists (step 1340). Although the grantor may not create executable offer related messages, the grantor may view other offers from counterparties without having the right to accept such offers. The grantor is also precluded from killing the offer granted to the requestor until the held order has expired. Essentially, the grantor cannot repudiate or revoke an offer once a held order has been granted. The offer must either be accepted or expire naturally.

As a result, after the restrictions have been properly placed on the grantor, the time allowed for the held order is identified (step 1344) and a clock is initialized (step 1348). A clock may be initialized by setting it equal to zero and identifying when time has exceeded the held order allowable time. Alternatively, as depicted in FIG. 13, a clock may be set for the held order allowable time and the clock may count down until zero, at which point the held order has expired. The clock may be maintained at the requestor's operating system as well as the grantor's operating system. The amount of time allowed for a held order may range from seconds to hours to days depending upon the grantor's requirements.

After the clock has been initialized, the method determines if the held order has expired (step 1352). If the held order has not yet expired, then the method continues by determining if the grantee (i.e., the held order requestor) has submitted a counteroffer to the offer associated with the held order (step 1356). If the held order grantee has not created a counteroffer, then it is determined if the held offer has been accepted (step 1360). In the event that the held order has not yet been accepted, then the amount of time left until expiration of the held order is displayed to the grantee (step 1364). The time may be continuously displayed to the grantee or the time may only be incrementally updated. After the time is displayed to the grantee, the method returns to step 1352.

If the grantee accepts the held offer, then the held offer is executed at the execution system 212 of record associated with the requester since it is the requester that currently has the execution gate (step 1368). Once the trade has been executed, notification of the same may be transmitted to the grantor of the held trade. Furthermore, the restrictions on the grantor may be released such that the grantor can engage in other transactions if desired.

Referring back to step 1352, if the held order has expired or upon submission of a counteroffer, the held order is released along with the restrictions on the grantor (step 1372). Following the release of the grantor from the various restrictions associated with the held order, the execution gate is transferred back from the requestor's execution system 212 of record to the grantor's execution system 212 of record (step 1376). The expiration of a held order does not necessarily mean that an offer has expired and further does not mean the grantor is done trading. Rather, the offer may still be acceptable but the rights of the grantor to engage in other transactions has been restored. Hence, the grantor is allowed to execute other acceptances of the offer as well as engage in other transactions or negotiations (step 1320).

In accordance with at least one embodiment of the present invention, while the requestor is awaiting the grant of a held order, any other user associated with the same participant as the requesting user may be able to access the request and remove/alter the request. This in effect nullifies the original grant of the held order. Additionally, after a held order has been granted, any other user at the grantee counterparty can open the message, change trade parameters (e.g., create a counteroffer), and counter thereby nullifying the granted hold. Of course, counteroffers may also be submitted along with a request for a held order.

Furthermore, the grantee of the held order may also be restricted from accepting any other offers aside from the currently active held order. Therefore, in accordance with one embodiment, only one held order may be granted to a participant at a time for any specific transaction. Alternatively, only one held order or multiple held orders may be granted to a user at a time for multiple transaction, while a number of held orders may be allowable for a given participant.

Figure 14:
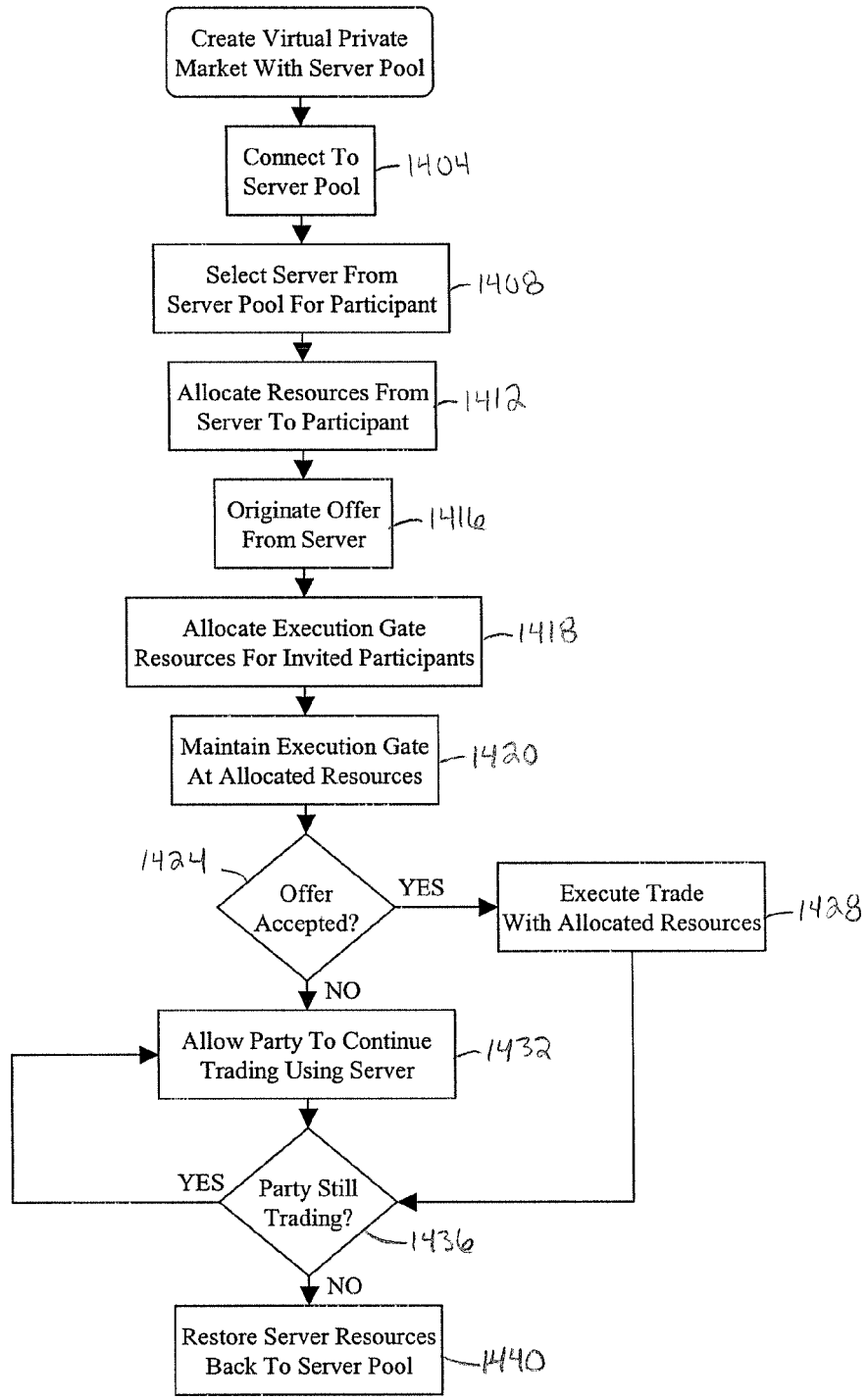
FIG. 14 is a flow chart depicting a method of creating a virtual private market with a server pool in accordance with embodiments of the present invention.

FIG. 14 is a flow diagram depicting a method of creating a virtual private market with a server pool 404 in accordance with at least some embodiments of the present invention. Initially, a participant 408 collects to the server pool 404 via a communication network or similar type of electrical connection (step 1404). This may be by directly accessing the server pool 404 or through the use of a central messaging system for the server pool 404. Upon connection, a server is selected from the server pool 404 for the participant 408 (step 1408). The server may be selected based upon the relative availability or traffic associated with each of the servers in the server pool 404. The server may also be selected based upon which servers are already assigned to other participants 408 that regularly interact with the connecting participant 408 or based upon existing transactions on the server pool 404 associated with the participant 408

Once a server is selected, resources for use by the participant 408 are allocated from the server (step 1412). The resources allocated to the participant 408 may include processing resources, memory resources, and/or communication resources. The resources may exhibit similar functionality to that of the application layer 208, execution system 212, and/or messaging system 216 depending upon the participant's 408 needs. The amount of resources allocated to the participant 408 may depend upon the participant's 408 typical trading volume as well as the participant's 408 subscription level (e.g., silver, gold, platinum, etc.).

With the resources allocated to the participant 408, the participant 408 is ready to engage in trading. Accordingly, the participant 408 may create a virtual private market by originating an offer (step 1416). The offer may be originated at the assigned server and transmitted to various identified counterparties 608. Once the participant 408 has transmitted an offer, the participant 408 has become the originator 604 in at least one virtual private market. This, however, does not preclude the participant 408 from being either an originator 604 or counterparty 608 in other virtual private markets.

Thereafter, execution gate or execution system 212 resources may be allocated to invited counterparties 608 (step 1418). This step may not be necessary in the event that the invited counterparties 608 own and maintain their own execution system 212 resources, for example on a private server. However, if the counterparties 608 do not maintain a person server for use in trading, then the resources may be allocated to those counterparties 608 from the server pool 404.

With respect to the originally transmitted offer, the execution gate is maintained at the allocated resources associated with the participant 408 (step 1420). Subsequently, it is determined whether the offer has been accepted or not (step 1424). If the offer has been accepted, then the trade is executed using the allocated resources from the server pool 404 (step 1428). Following execution of the trade, it is determined if the participant 408 is still trading with other participants 408 (step 1436). This determination may be made based on whether the participant 408 is still logged into the system and whether the participant 408 has any active messages in the inbox and/or outbox.

Reverting back to step 1424, if the offer has not been accepted, then the participant 408 is allowed to continue trading using the allocated resources (step 1432). Thereafter, the method continues to step 1436 to determine if the participant 408 is still engage in trading. If the participant 408 is still trading, then the method returns to step 1432 where the participant 408 is allowed to continue trading as an originator 604 and/or counterparty 608. On the other hand, if the participant 408 has completing trading activities, then the server resources are restored back to the server pool 404 for use by other participants 408 (step 1440).

Figure 15:
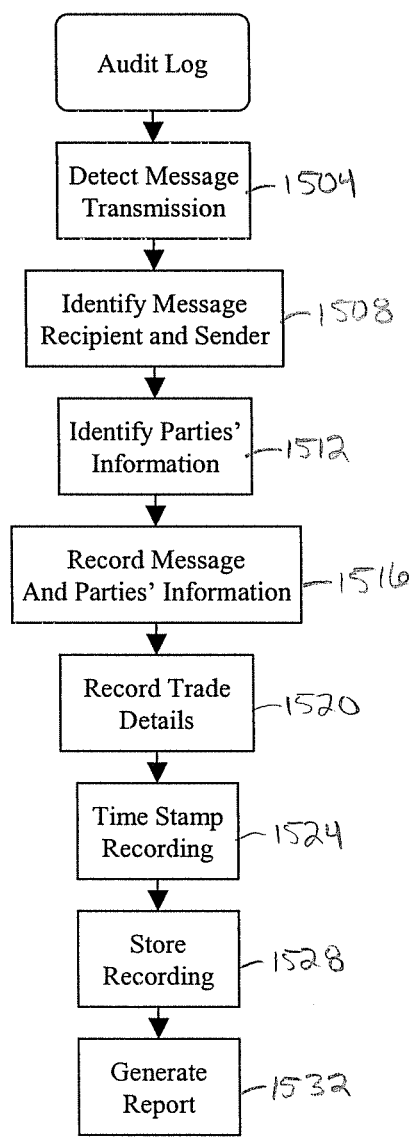
FIG. 15 is a flow chart depicting a method of preparing an audit log in accordance with embodiments of the present invention.

FIG. 15 is a flow diagram depicting a method of creating and managing an audit log in accordance with at least some embodiments of the present invention. Creation of an audit log begins when a transmitted message is detected (step 1504). The transmitted message may be detected either in an inbox or an outbox associated with a particular participant. When a message is detected, the method proceeds by identifying the message recipient and sender (step 1508). This particular information may be retrieved from the message header or from other data fields. Alternatively, in accordance with one embodiment of the present invention, an audit log may be individually maintained for each participant. In such an embodiment, the recipient will automatically be known if the message is detected in the inbox, whereas the sender will automatically be know if the message is detected in outbox. As can be appreciated by one of skill in the art, a given message typically has a single sender but may have a plurality of recipients. Accordingly, each recipient may need to be identified prior to progressing to the next step.

After the parties to the message have been identified, the message and party information is recorded and saved in an audit log (step 1516). The recorded data may be encrypted or assigned a digital signature such that integrity of the message and indication of any alteration of the information can be confirmed. In one embodiment, the information is maintained in a public audit log that can be viewed by persons with proper credentials, such access may be constrained to only the transactions associated with that given participant. In another embodiment, the information may be maintained locally by a given participant for internal records. Once the information has been recorded in an audit log, the trade details are recorded in association with the participant information (step 1520). The trade details may include the all parameters or a subset of various parameters associated with a given offeror counteroffer. Maintaining a log of trade details can help determine if participants have been trading fairly with other participants and also to track trade volume.

When the trade details have been recorded, the method continues by applying a time stamp to the recording (step 1524). More specifically, a time stamp may indicate the time that the information was detected and that time may be maintained in association with the recorded offer. As further counteroffers are received in connection with a given trade or virtual private market, the audit log may be amended to include the new messages along with their corresponding time stamp. The time stamps help to create a historical picture of how a particular negotiation progressed through time.

Thereafter, the audit log is stored in memory (step 1528). The audit log may be maintained either in the database 412 or locally on memory controlled by a participant. The memory is preferably non-volatile memory such as a hard disk drive from which information can be accessed at a later time. In addition to storing the audit log, an audit report may be generated either for review by personnel of a participant (e.g., system administrator 516 or risk manager 520) or for review by auditing personnel such as during a tax audit or during preparation of government required business documentation. For example, the audit log may be generated in compliance with the Sarbanes Oxley Act of 2002.

It accordance with one embodiment of the audit log, only information specific to each party for a specific transaction is recorded in that party's audit log. In other words, the audit log of an originator 604 may contain all messages regarding the specified transaction originated from the originator 604 and replies received in response thereto, whereas the audit log of a counterparty 608 may only include messages regarding the specified transaction between the counterparty 608 and the originator 604.

Figure 16:
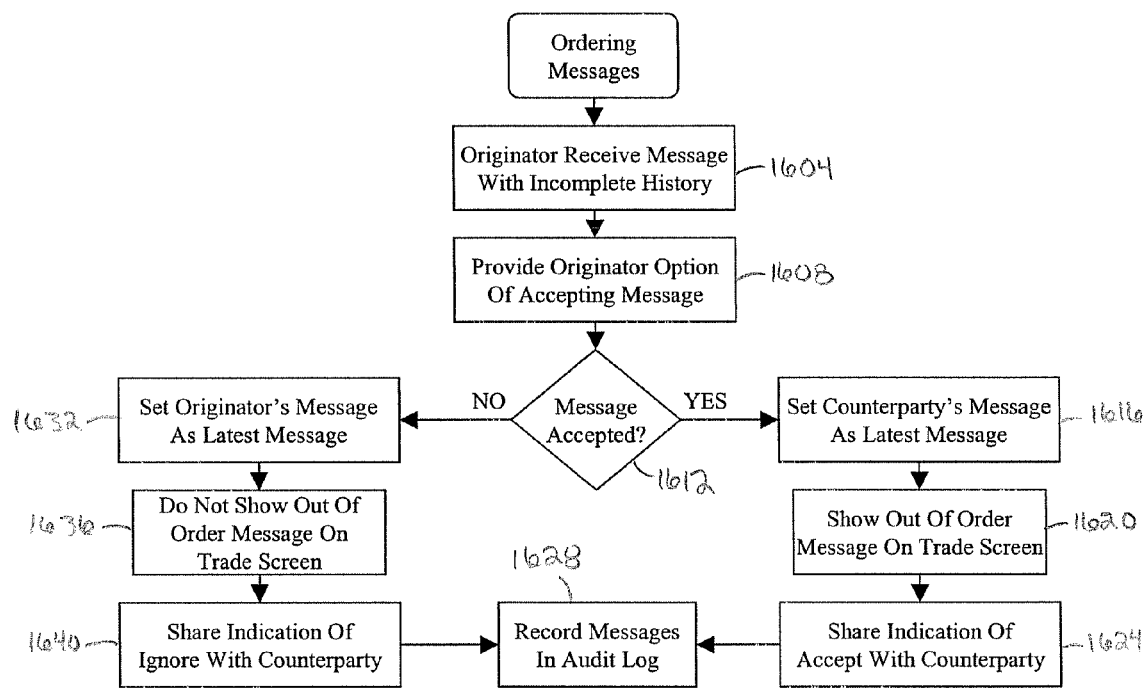
FIG. 16 is a flow chart depicting a method of handling simultaneously transmitted messages in accordance with embodiments of the present invention.

FIG. 16 is a flow chart depicting a method of ordering messages that are out of order in accordance with at least some embodiments of the present invention. Although the following method will be described in reference to an originator 604 receiving an out of order message, one skilled in the art will appreciate that the same steps may be applied to a counterparty 608 receiving an out of order message.

Initially, an originator 604 receives a message having an incomplete message history (step 1604). An incomplete message history is defined as any messages received by the originator 604 that are in response to an older version of an offer (i.e., a dead offer). Embodiments of the present invention incorporate technology to allow validation of the entire messaging chain from original message to the current message and the content of all intermediate messages. In this manner, embodiments of the present invention allow the originator 604 to be notified that a message has an incomplete message history when compared with the latest message sent or received by the originator 604. An offer is preempted by a newer offer, whenever the newer offer is transmitted. Accordingly, the older offer should not be acceptable and when acceptance of an older offer is received, the message history is incomplete.

Upon receiving a message with an incomplete message history, the originator 604 is provided with the option of accepting the message (step 1608). In other words, the originator 604 may choose to accept an acceptance of an older offer even though a newer offer exists. Therefore, it is determined if the originator 604 has accepted the message and therefore will allow the acceptance to a presumably expired offer (step 1612). If the message is accepted by the originator 604, then the counterparty's 608 message (i.e., the acceptance message or counteroffer) is set as the latest message and the terms of that acceptance or coumteroffer are adhered to during the continued negotiation or execution of the transaction (step 1616). Accepting a message may indicate that the out of order message has been accepted or that a counteroffer has been made. As an example, assume a first message was an offer for $5.00 and the crossing message was an offer for $4.95. The offering party would want to accept the $4.95, not live the $5.00 bid. In this case, the $4.95 offer should be showing on the originator's 604 message review screen and a message should be sent to counterparty's 608 message review screen telling it to remove the originator's 604 $5.00 bid and replace it with the counterparty's 608 $4.95 offer. Note that this implies that the ability to execute on the $5.00 bid is blocked during the originator's review of the out of order message alert and until the originator selects which to choose. However, the counterparty's 608 offer clock will continue to run down during this review period. After acceptance, the originator's message (i.e., the new offer that should have preempted the older but accepted offer), is shown on the originator's 604 message view screen (step 1620). By altering the display in this fashion, the order of offer and acceptance is set such that the originator's 604 message on the audit log appears as message n−1, and the out of order message is recorded as message n. In addition to displaying the messages on the originator's 604 message view screen, an indication that the acceptance has been acknowledged and accepted is sent to the counterparty 608 (step 1624). This message may be transmitted before or after the trade is executed at the originator's 604 execution system 212. Finally, the order of the messages for the message log is adjusted to reflect the choice made by the originator 604 (step 1628).

Referring back to step 1612, in the event that the originator 604 chooses not to accept the out of order message and rather chooses to maintain the newest offer terms, then the originator's 604 message or offer is set as the most recent offer (step 1632). Accordingly, the counterparty's 608 out of order message is not shown on the originator's 604 message view screen (step 1636). Additionally, the out or order message is recorded on the audit log as the n−1 message, while the originator's 604 message is recorded as message n.

Thereafter, the originator 604 may transmit a message to the counterparty 608 indicating that the acceptance received was out of order and denied by the originator (step 1640).

Once the counterparty 608 has been made aware that the acceptance was rejected because it was an out of order message, the method continues by recording the order of messages for the audit log (step 1628). An exemplary situation describing a situation where an out of order message (i.e., a message with an incomplete history) may originate will be described without intending to limit aspects of the present invention. Consider an originator 604 that sends a first proposal (O1) to counterparties A 608*a* and B 608*b*. After submitting the first offer with an executable clock, the originator 604 sends a second offer (O2) to the same counterparties 608 where a parameter of the first offer is adjusted in the second offer. One example might be that the originator 604 noticed that he/she made an error in the volume for a specific month. Following the transmission of the second offer, but prior to receipt of the second offer by the counterparties 608, one of the counterparties 608 accepts the terms of the first offer (A1) at which time there are two discrete and non-matching messages being transmitted, namely O2 and A1. One updated offer is being transmitted to the counterparties 608 while the acceptance of the first offer is being transmitted to the originator 604.

At a later time, the originator 604 receives the acceptance message A1 from the accepting counterparty 608 but the acceptance does not match the most recently sent offer O2. Accordingly, the decision is left to the originator 604 to determine whether to accept the acceptance A1 or to reject the acceptance A1 and limit acceptance to the second offer.

Depending upon whether the originator 604 accepts the acceptance A1, the audit log for each participant will need to reflect the originator's 604 resolution of the out of order condition. Namely, if the originator 604 allows the acceptance A1, then the order of the audit log of the originator 604 may be O1 (sent)—A1 (received)—O2 (sent and canceled) while the audit log of the counterparty 608 may be O1 (received)—A1 (sent). However, if the originator 604 does not allow the acceptance A1, then the order of the audit log of the originator 604 may be O1 (sent)—O2 (sent)—A1 (rejected) while the audit log of the counterparty 608 may be O1 (received)—O2 (received)—A1 (sent and rejected). In this particular embodiment, A1 will more closely resemble a counteroffer that was rejected rather than an acceptance. In accordance with at least some embodiments of the present invention, a message from the originator 604 to both the originator's 604 and the counterparty's 608 audit log describing the out of order condition, the originator's 604 resolution of the condition, and the final correct audit log records for both parties will be recorded in the audit log.

Figure 17:
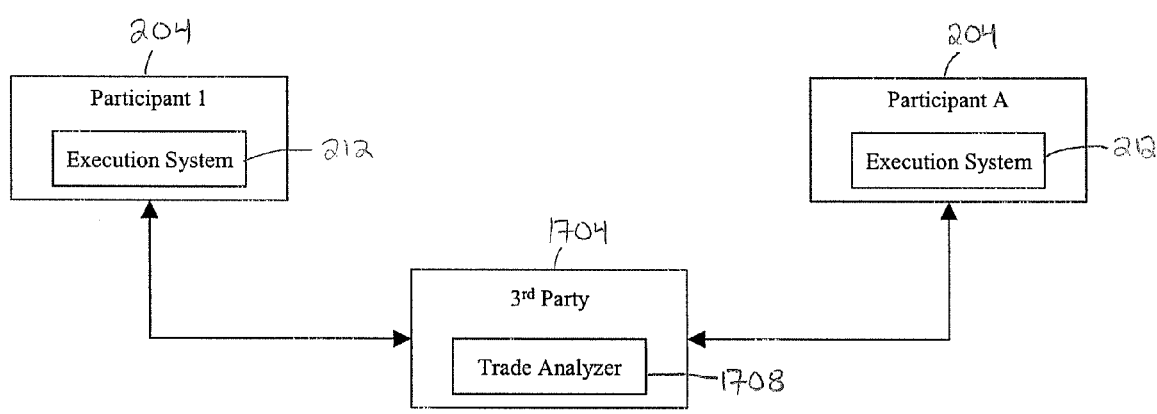
FIG. 17 is a block diagram depicting a decentralized market incorporating a third party in accordance with embodiments of the present invention.

FIG. 17 is a block diagram depicting a third party 1704 service or analysis offered to a virtual private market in accordance with at least some embodiments of the present invention. The third party 1704 may include a trade analyzer 1708 for analyzing various aspects of a given trade. One participant 204 or both participants 204 may select a third party service for a transaction, either as a service to be performed prior to transaction execution or for a service to be performed in the performance of the contract entered into upon execution of a transaction. As an example, suppose one of the participants 204 wishes to receive the third party 1704 analysis of the terms of the transaction prior to executing the other participant's 204 offer. The trade analyzer 1708 may be employed to check credit history and the fairness of a given trade. The trade analyzer 1708 may also be used to determine the transaction valuations and portfolio valuation of each participant 204 prior to allowing the participant to execute a given trade.

In accordance with one embodiment of the present invention, a risk manager 520 may request that trades for certain users 508 go through the trade analyzer 1708 prior to allowing execution. Alternatively, the risk manager 520 determine that trades over a certain price or quantity threshold need to be analyzed and approved by the third party 1704 prior to being accepted and executed. The third party 1704 acts as a safe guard against market abuses as well. The third party 1704 may be an entity other than any participants 204 in a given virtual private market that is asked to measure conduct within the virtual private market. In one embodiment, the third party 1704 is incapable of transmitting messages to any party other than the two participants 204 engaging in a given transaction.

Figure 18:
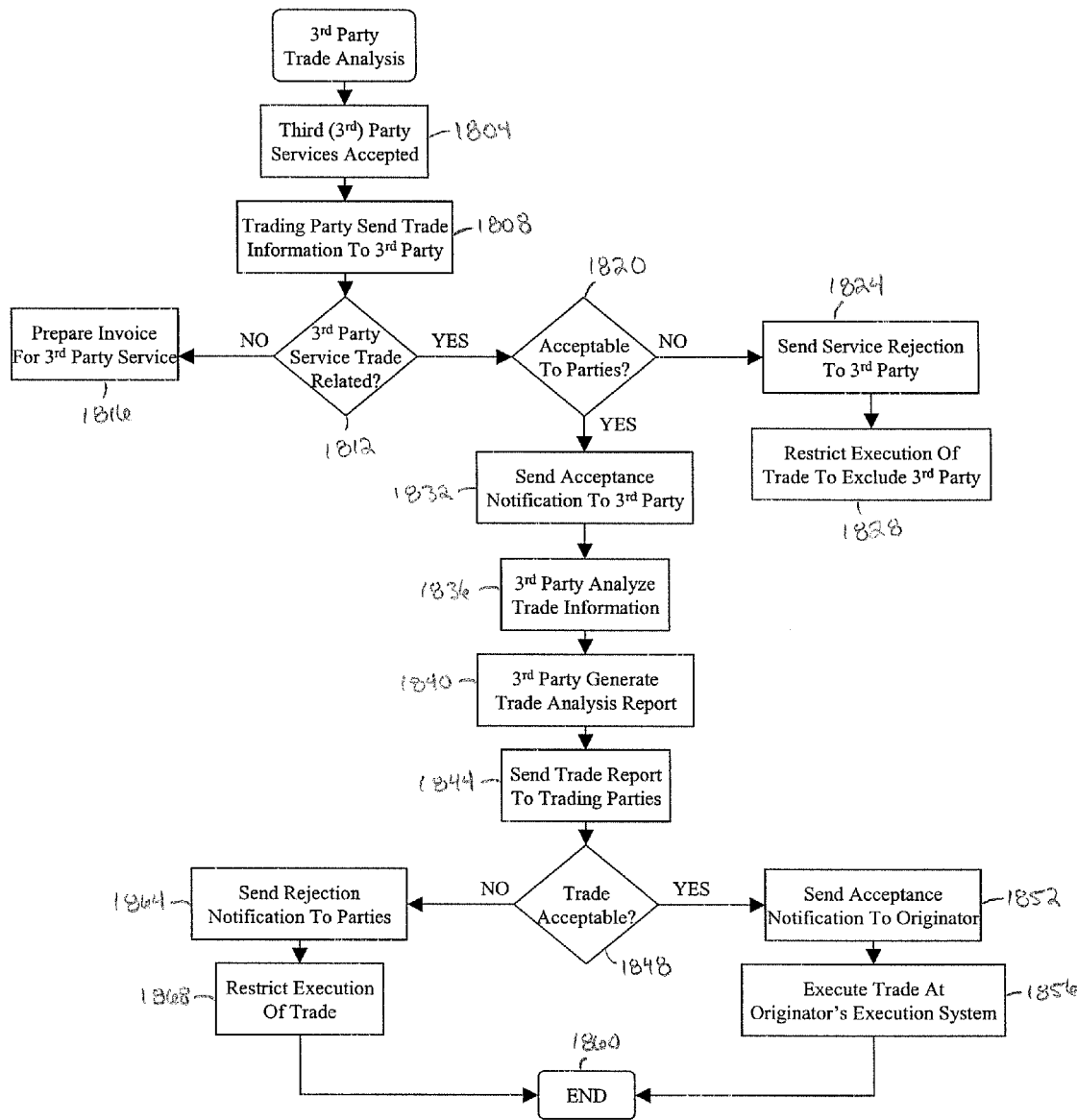
FIG. 18 is a flow chart depicting a method of executing a transaction in a decentralized market using a third party analysis in accordance with embodiments of the present invention.

With reference now to FIG. 18, a method of employing a third party analysis will be described in accordance with at least some embodiments of the present invention. The method is initiated when an offer of third party service is accepted by a trading party (step 1804). Once the offer is accepted, the terms of the transaction are transmitted to a third party 1704 (step 1808). The terms of the transaction may be transmitted from the originator 604 or a counterparty 608 and may occur at initiation of a transaction, at any intermediate step or at the time of transmission of an acceptance message. In accordance with one embodiment, the acceptance is initially sent by the originator 604 since originator 604 is maintaining the execution gate. Upon receiving the acceptance, the originator 604 may transfer the terms of the agreement to the third party 1704 for analysis prior to executing the trade.

Once the third party 1704 has received the trade details, it is determined if the third party 1704 will be providing a trade related service (step 1812). In other words, if the execution or performance of the transaction after execution (a service to be performed for the parties during the term of the contract) of the trade depends upon the analysis of the third party 1704, then the third party 1704 is providing a trade related service. Otherwise, the third party 1704 is providing an information service.

If the third party 1704 is providing an information service, such as a trade valuation, then the third party 1704 analyzes the trade and prepares an invoice containing the information requested by the parties to the transaction (step 1816).

However, if the third party 1704 is providing a trade related service, such as, for example, credit intermediation, then the third party 1704 determines if its intermediation is acceptable to both parties to the transaction (step 1820). If the third party 1704 services are unacceptable to one or parties, then the objecting party sends the third party 1704 a rejection of services notice (step 1824). Upon receiving the rejection notice or in response to inaction of one or both parties, the execution of the trade is restricted to exclude the third party 1704 service (step 1828).

On the other hand, if the third party service is acceptable, then the parties may send an acceptance notification to the third party 1704 (step 1832). Thereafter, the third party 1704 employs the trade analyzer 1708 to analyze various aspects of the trade (step 1836). Based on the analysis, the third party 1704 generates a trade analysis report (step 1840). The trade analysis report may illustrate the results of the analysis as well as recommendations related to the analysis (e.g., acceptable trade, unacceptable trade, marginal trade, etc.). The analysis report may also reflect the credit history and score of each participant. Furthermore, the trade analysis report may analyze the level of risk associated with executing the proposed trade. Thereafter, the report is sent to one or both of the trading participants (step 1844).

In one embodiment, the trade analysis report is only transmitted to the originator 604, who is given the right to share the information with the counterparty 608. Based on the analysis detailed in the report, it is determined if the trade is acceptable (step 1848). This decision may be made by the risk manager 520 or a user 508 depending upon the magnitude of the trade. Alternatively, the right to accept the trade may be controlled by the report itself. If the report indicates that the trade is too risky, then the report may include a mechanism that restricts the execution system 212 from executing the associated trade.

If the trade is determined to be acceptable, then the method proceeds by sending an acceptance notification to the counterparty 608 (e.g., the party that accepted the offer) (step 1852). In one example the right to accept the trade is controlled by the report itself or the method proceeds by allowing all normal activities in the trade process as are embodied in the system. Thereafter, the trade is executed at the execution system 212 associated with the originator 604 (step 1856). Finally, the method ends after the execution of the trade (step 1860).

On the other hand, if the trade is determined to be unacceptable, then the method proceeds by sending a message regarding the rejection of the trade to the counterparty 608 (step 1864). In one example, the report is controlling of the method or the method proceeds by allowing all normal activities in the trade process as are embodied in the system. If the determination regarding acceptance is made at the third party 1704, then the message is transmitted to both participants. Alternatively, the third party 1704 may transmit the message to the originator 604, who may then forward the message on to the counterparty 608. After the participants have been notified of the non-acceptance of the trade, the trade is restricted from being executed (step 1868). Execution of the trade may be limited by sending a message to the execution system 212 of record identifying the non-acceptable trade. Alternatively, the trade may be limited by destroying the trade terms altogether. Thereafter, the method ends (step 1860).

Embodiments of the present invention, while most beneficial in commodity markets are valid for any commoditized or non-commoditized market. In accordance with one embodiment of the present invention, the features are applicable to markets where the participants have previously executed master bilateral agreements but is not necessarily limited to such. In addition, embodiments of the present invention allow for the execution of physical, financial or derivative transactions.

Furthermore, embodiments of the present invention may be combined with existing central execution point systems; however, such a network configuration is not required.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and market transactional arts.

What is claimed is:

1. A decentralized system for conducting transactions, comprising:
   first server resources associated with a first trading party, the first server resources comprising the following in the form of instructions stored in tangible memory:
   an application layer;
   a first execution system configured to execute offer-and-acceptance-type transactions initiated by the application layer of the first server in response to the first trading party generating and submitting an offer to a second trading party; and
   a first messaging system working in conjunction with the first execution system;
   second server resources associated with the second trading party, the second server resources in communication with the first server resources, the second server resources being separate and distinct from the first server resources and the second server resources comprising the following in the form of instructions stored in tangible memory:
   an application layer;
   a second execution system, different from the first execution system, configured to execute offer-and-acceptance-type transactions initiated by the application layer of the second server in response to the second trading party generating and submitting one or more of an offer and counteroffer to the first trading party or a third trading party; and
   a second messaging system working in conjunction with the second execution system;
   wherein the first trading party originates a transaction using the application layer of the first server resources, wherein the transaction comprises an offer having a number of parameters associated therewith, wherein the first trading party employs the first messaging system of the first server resources to send the offer to the second server resources, and wherein automatic execution rights associated with the transaction are maintained exclusively by the first execution system of the first server resources, and wherein the first and second trading parties are counterparties to the transaction.

2. The system of claim 1, wherein at least one of the first and second server resources are temporarily allocated to the respective trading party from a server pool, and wherein the temporarily allocated server resources are returned to the server pool for allocation to another trading party after the transaction has at least one of expired, been rendered unavailable, been killed, and been executed.

3. The system of claim 1, wherein at least one of the first and second server resources are maintained by the respective first and second trading parties.

4. The system of claim 1, wherein the exclusive automatic execution rights of the first execution system of the first server resources are transferred to the execution system of the second server resources in response to the first trading party granting the second trading party a held order, wherein the held order comprises a time dependent free option on the transaction allowing the second party to decide whether or not to accept the offer generated by the first party within a predetermined amount of time and wherein during that predetermined amount of time the first execution system of the first party is restricted from executing any other transactions.

5. The system of claim 1, wherein messages transmitted between the first and second messaging systems of the first and second server resources, including information related to the execution of the transaction, are maintained in confidentiality between the first and second parties.

6. The system of claim 1, wherein the first execution system automatically executes the transaction based on executed parameters that comprise one of the following:
   i) in the event that the second trading party accepts the offer from the first trading party, the executed parameters comprise the parameters associated with the original offer; and
   ii) in the event that second trading party transmits a counteroffer to the first trading party, the executed parameters comprise parameters associated with an accepted counteroffer.

7. The system of claim 6, wherein the accepted counteroffer is transmitted by the second trading party to the first party and accepted at the first execution system of the first server.

8. The system of claim 1, further comprising a database for maintaining audit logs, wherein an audit log maintained for the first trading party comprises messages transmitted by the first messaging system of the first server resources, and wherein an audit log maintained for the second trading party comprises message transmitted by the second messaging system of the second server resources.

9. A method of initiating a transaction in a decentralized market, comprising:
   determining at least one participant that will be invited to participate in the transaction as a counterparty to the transaction;
   in response to determining the at least one participant, generating participant data with a first server resource maintained in tangible memory and associated with a first trading party that is also a counterparty to the transaction and will bound to a legal agreement with the first party in the event the at least one participant accepts terms of the transaction;
   determining, at the first server resource, transaction details;
   in response to determining said transaction details, generating transaction data at the first server resource;
   creating a message at the first server resource, the message comprising at least one of said participant data and transaction data; and
   sending said message to said at least one participant, wherein said message is transmitted from a single originating execution point corresponding to the first server resource to a different execution point physically separated from the single originated execution point by a publicly accessible communication network and further associated with the at least one participant and wherein information related to said transaction is maintained in a secure state at said originating execution point and only shared with the at least one participant that received the message.

10. The method of claim 9, wherein said determining transaction details comprises at least one of determining a commodity, whether the transaction is to buy or sell the commodity, a price of the commodity, an amount of the commodity, and an offer expiration time.

11. The method of claim 9, wherein said determining transaction details comprises at least one of determining a commodity and an amount of the commodity, and wherein transmission of the transaction details is allowed without a determination of a price for purchase or sale of the commodity.

12. The method of claim 11, further comprising retaining an ability to create an executable transaction and offer expiration time after a price of the commodity is determined.

13. The method of claim 9, wherein said determining transaction details comprises determining that the transaction comprises a held transaction.

14. The method of claim 13, further comprising:
    a first party granting the held transaction to a second party for a predetermined amount of time, the first party being associated with the first server resource;
    restricting the first server resource from accepting offers from any party other than the second party for the predetermined amount of time; and
    allowing the second party to have the option of accepting the held transaction without risk of the held transaction being revoked for the predetermined amount of time.

15. The method of claim 14, wherein the first party comprises an originating party.

16. The method of claim 14, further comprising transferring an execution gate from the first server resource to the second party for the predetermined amount of time.

17. The method of claim 16, further comprising after the predetermined amount of time, transferring the execution gate back to the first party.

18. The method of claim 9, wherein said sending said message comprises encrypting the message prior to transmission.

19. The method of claim 9, wherein at least one of said originating execution point and said execution points of said at least one participant comprises at least one of a computer, server, and database.

20. The method of claim 9, further comprising maintaining an execution gate in association with an originating participant such that only the execution point associated with the originating participant is allowed to execute a transaction originated by the originating participant.

* * * * *